(12) United States Patent
Goto

(10) Patent No.: US 8,554,088 B2
(45) Date of Patent: Oct. 8, 2013

(54) OPTICAL TRANSMISSION APPARATUS, OPTICAL TRANSMISSION SYSTEM, AND OPTICAL TRANSMISSION METHOD

(75) Inventor: Ryosuke Goto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 342 days.

(21) Appl. No.: 12/879,247

(22) Filed: Sep. 10, 2010

(65) Prior Publication Data

US 2011/0058821 A1 Mar. 10, 2011

(30) Foreign Application Priority Data

Sep. 10, 2009 (JP) ................................ 2009-209545

(51) Int. Cl.
*H04B 10/08* (2011.01)
*H04B 10/04* (2011.01)
*H04J 14/02* (2006.01)

(52) U.S. Cl.
USPC ................ 398/201; 398/197; 398/28; 398/34

(58) Field of Classification Search
USPC ...................... 398/160, 177, 197, 201, 28, 34
See application file for complete search history.

(56) References Cited

U.S. PATENT DOCUMENTS

| | | | |
|---|---|---|---|
| 6,512,628 | B1 | 1/2003 | Terahara et al. |
| 7,408,146 | B2 | 8/2008 | Yano |
| 2003/0090780 | A1 | 5/2003 | Sobe et al. |
| 2005/0024712 | A1 | 2/2005 | Hiraizumi et al. |
| 2005/0123305 | A1 | 6/2005 | Kawasumi |
| 2006/0171019 | A1* | 8/2006 | Charlet et al. ............... 359/334 |
| 2006/0219878 | A1* | 10/2006 | Yano ........................ 250/227.11 |
| 2008/0123180 | A1 | 5/2008 | Nakata |
| 2009/0238582 | A1 | 9/2009 | Tsunoda et al. |
| 2009/0317076 | A1 | 12/2009 | Shimizu |

FOREIGN PATENT DOCUMENTS

| | | |
|---|---|---|
| JP | 2001-251006 | 9/2001 |
| JP | 2003-139656 | 5/2003 |
| JP | 2006-189465 | 7/2006 |
| JP | 2006-245343 A | 9/2006 |
| JP | 2006-287649 A | 10/2006 |
| WO | WO 2004/045114 A1 | 5/2004 |
| WO | WO 2006/137123 A1 | 12/2006 |
| WO | WO 2008/099507 A1 | 8/2008 |
| WO | WO 2008/105027 A1 | 9/2008 |

OTHER PUBLICATIONS

Japanese Office Action mailed Oct. 9, 2012 for corresponding Japanese Application No. 2009-209545, with Partial English-language Translation.
Japanese Office Action mailed May 14, 2013 for corresponding Japanese Application No. 2009-209545, with partial English-language translation.

* cited by examiner

*Primary Examiner* — Leslie Pascal
(74) *Attorney, Agent, or Firm* — Fujitsu Patent Center

(57) ABSTRACT

An optical transmission apparatus in an optical transmission system that transmits an optical signal through a transmission fiber includes a measurement device that measures Raman gain efficiency of the transmission fiber; a level determiner that determines an input level of the optical signal based on Raman gain efficiency measured by the measurement device; and a controller that controls a level of the optical signal input to the transmission fiber to become the input level determined by the level determiner.

10 Claims, 19 Drawing Sheets

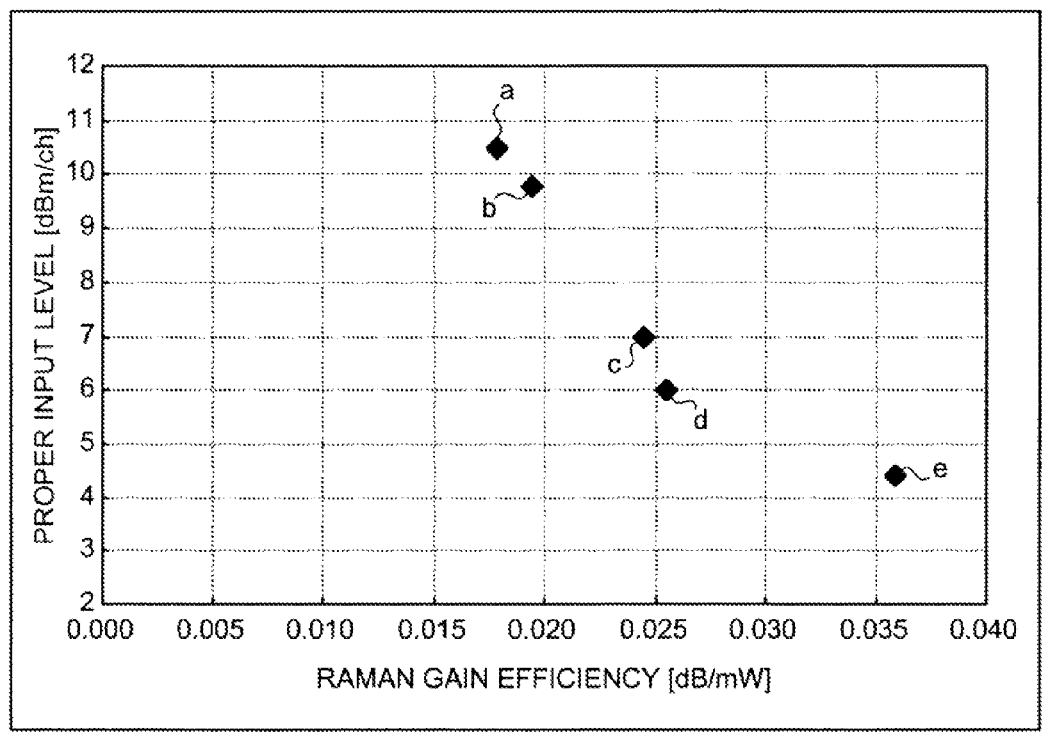

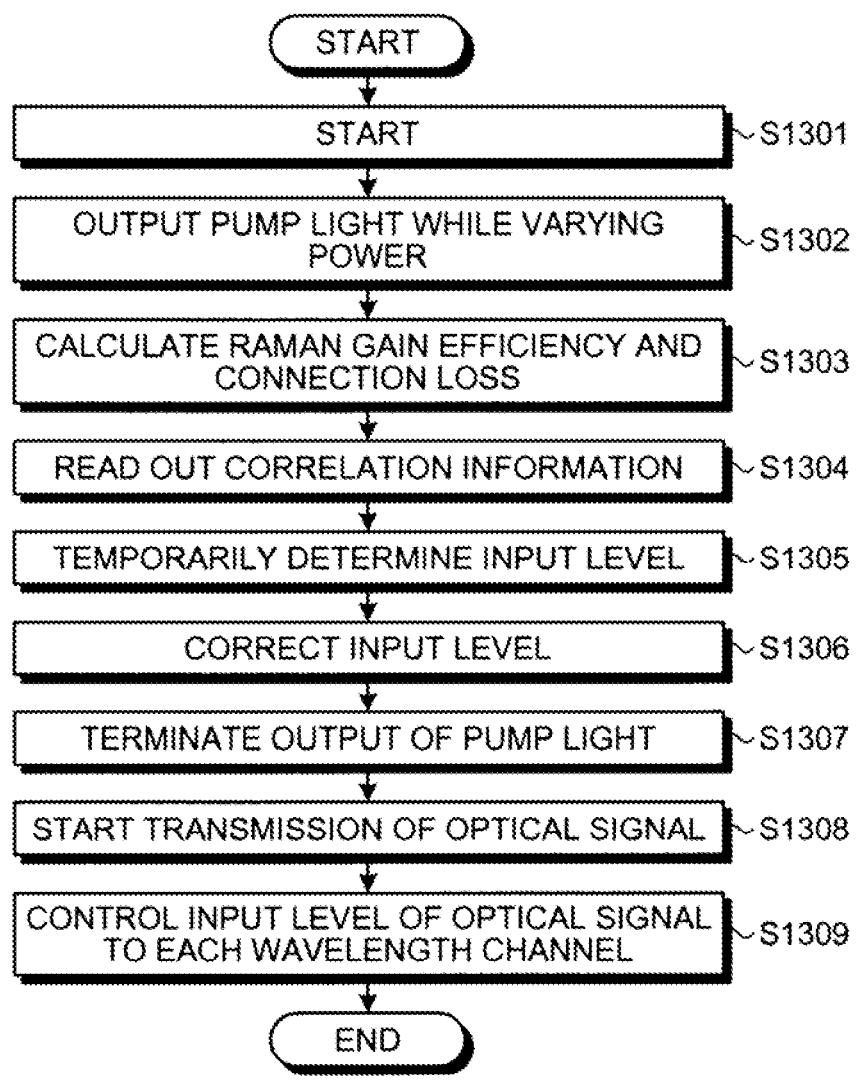

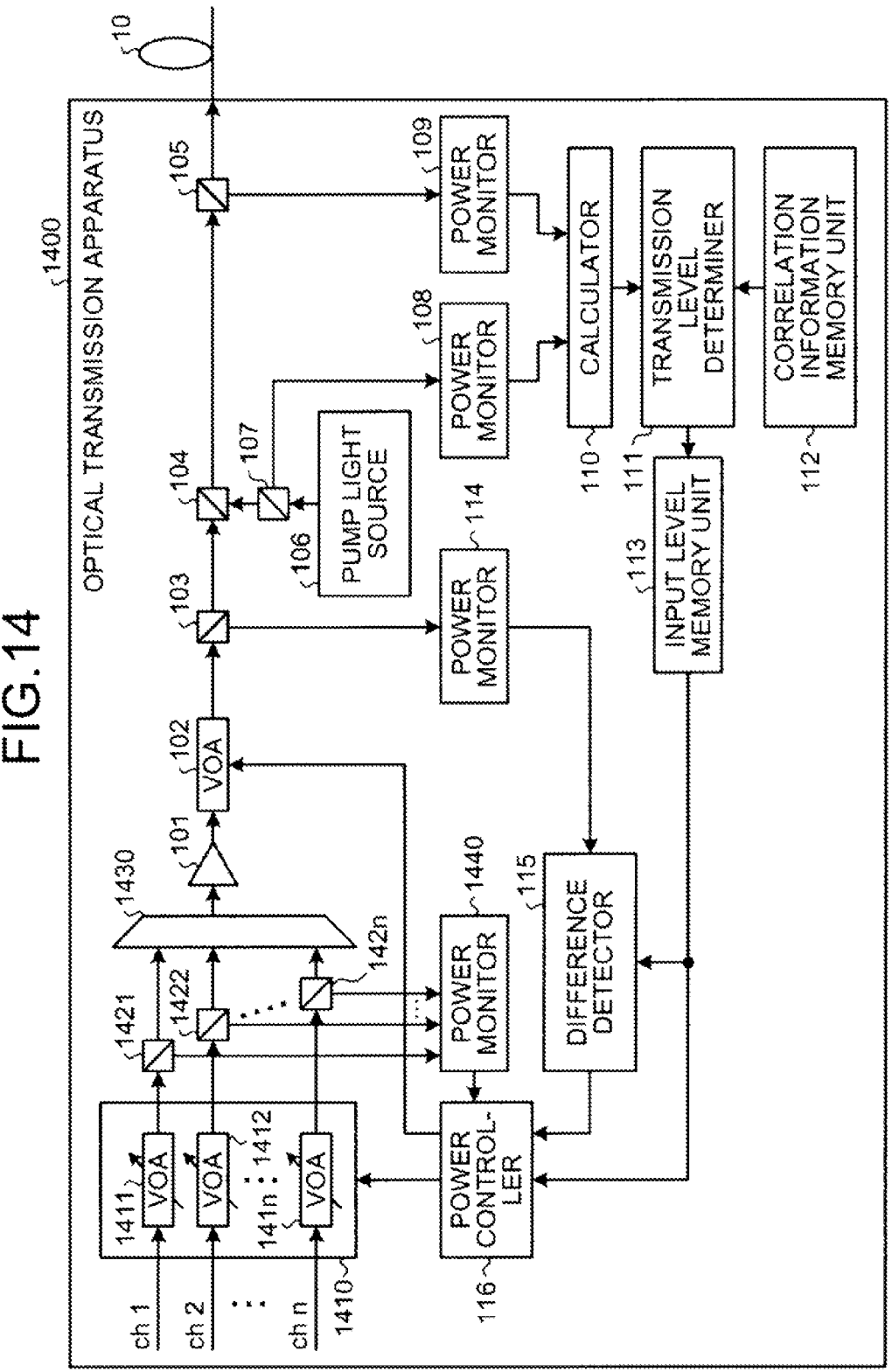

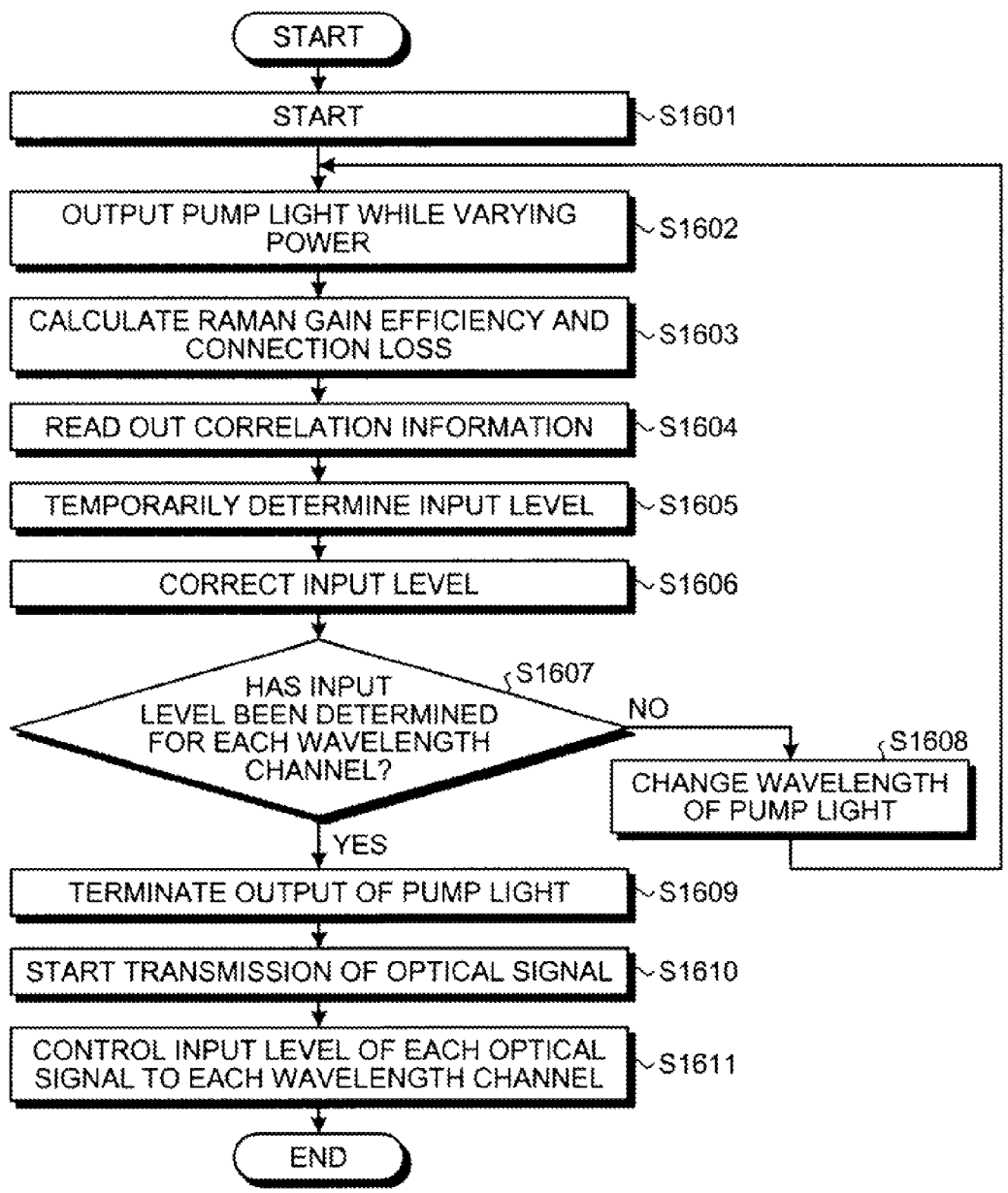

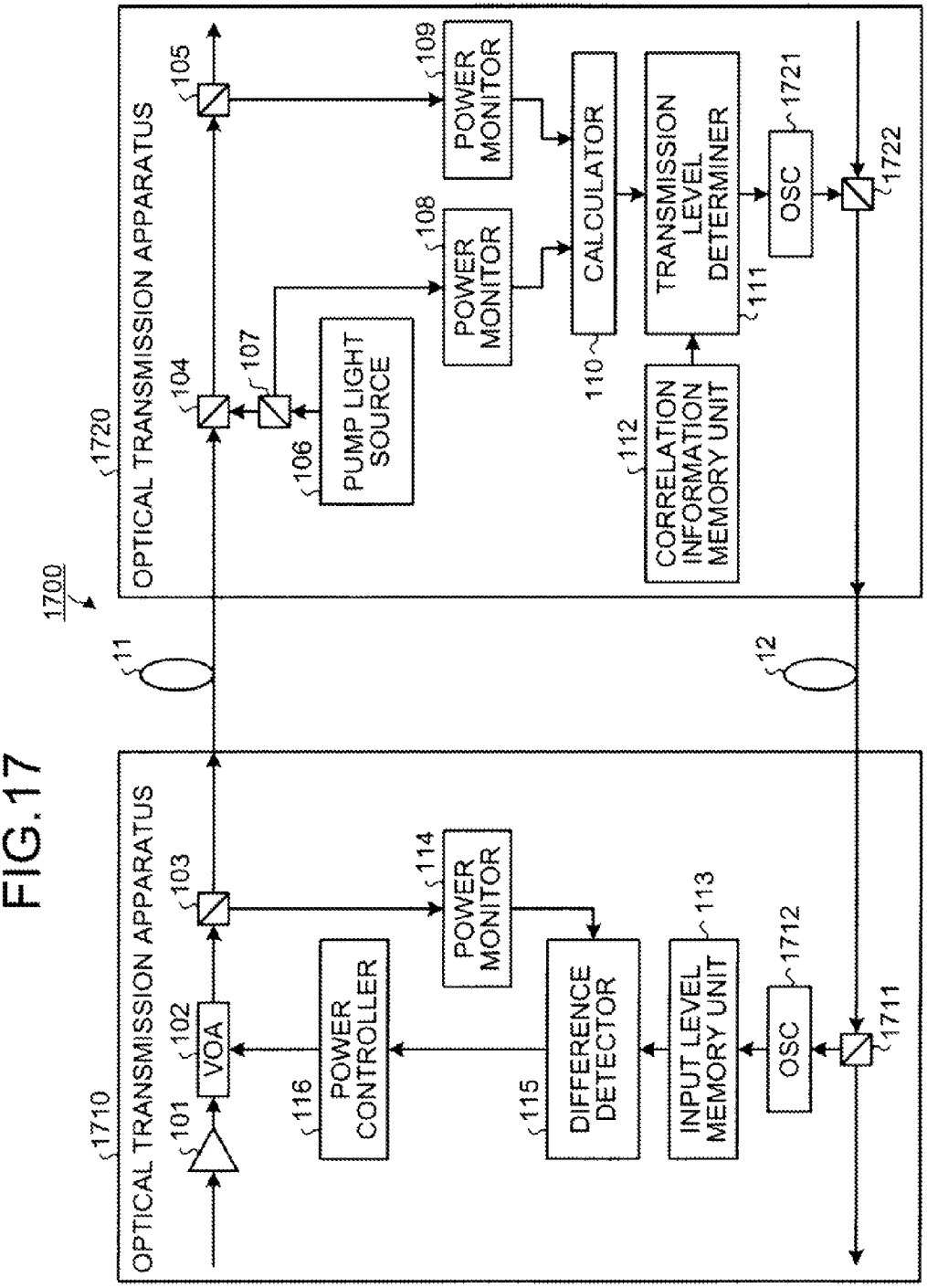

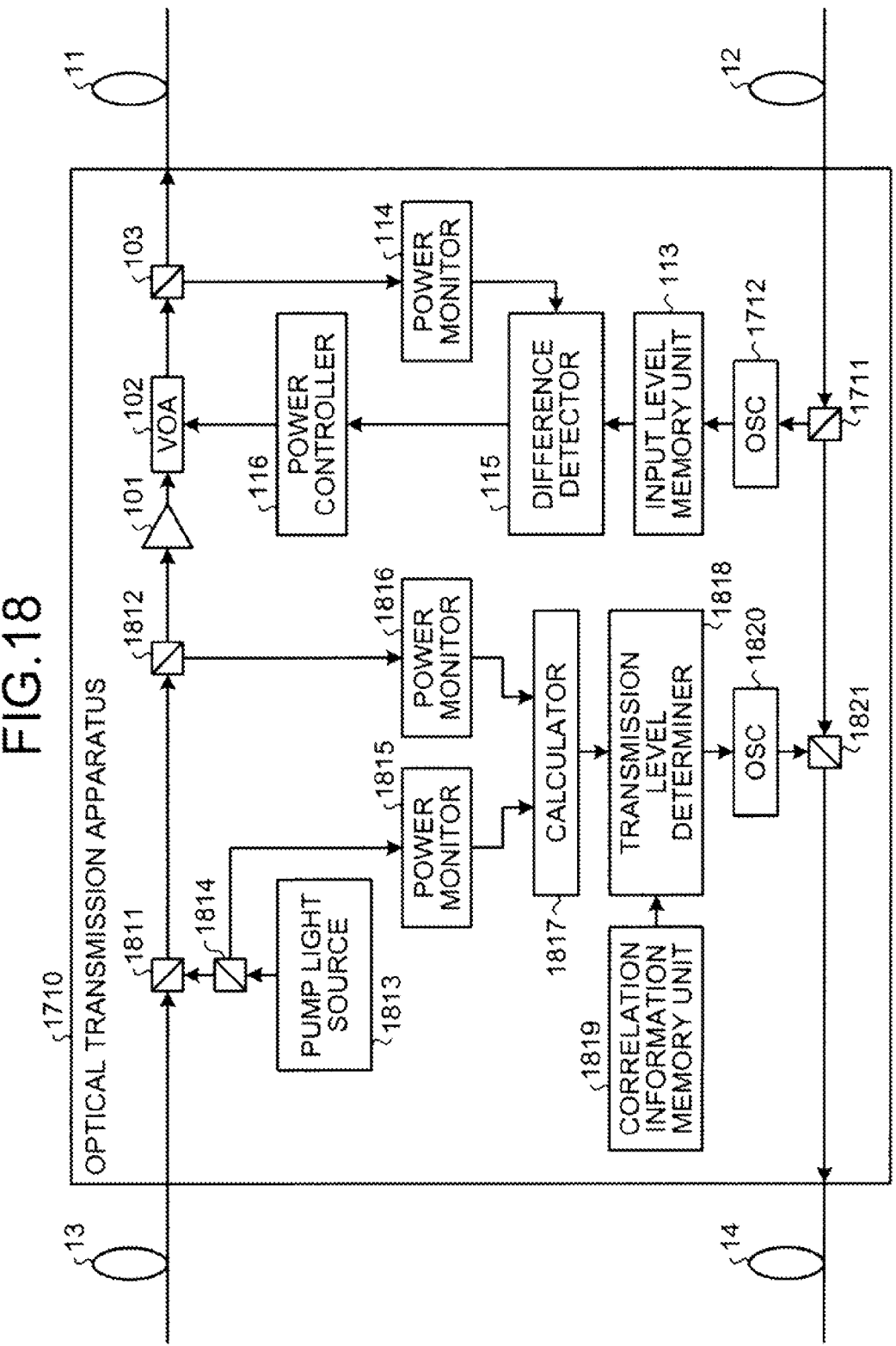

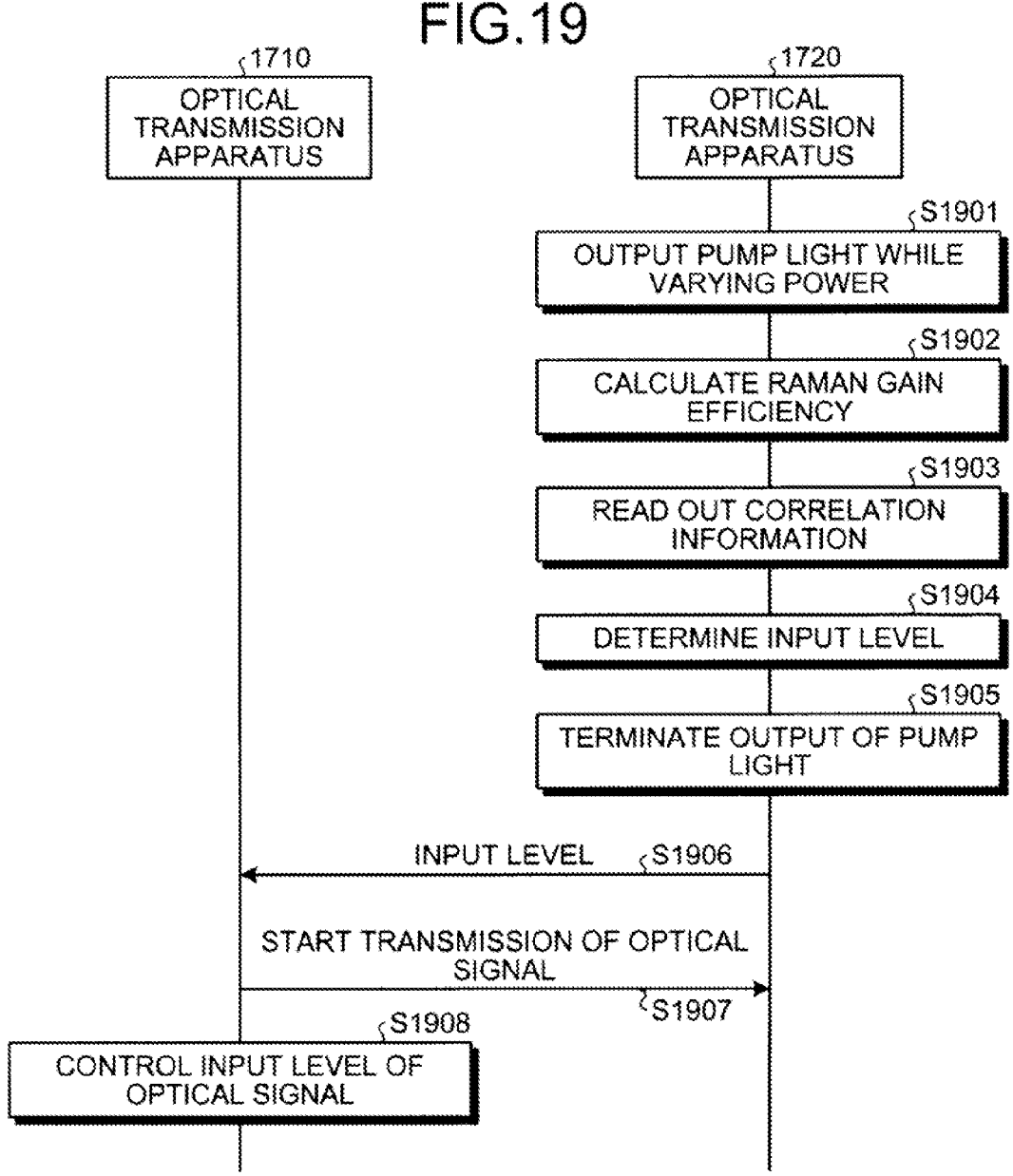

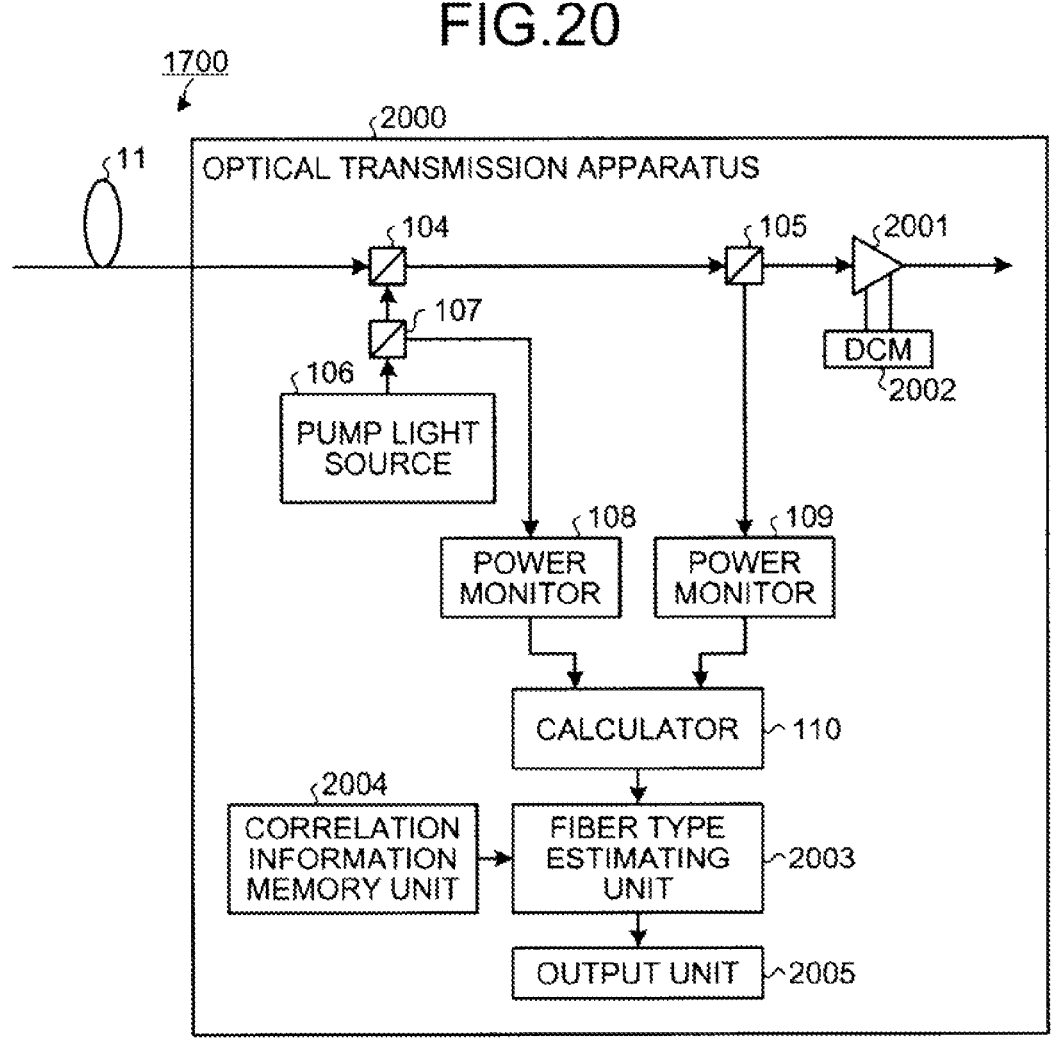

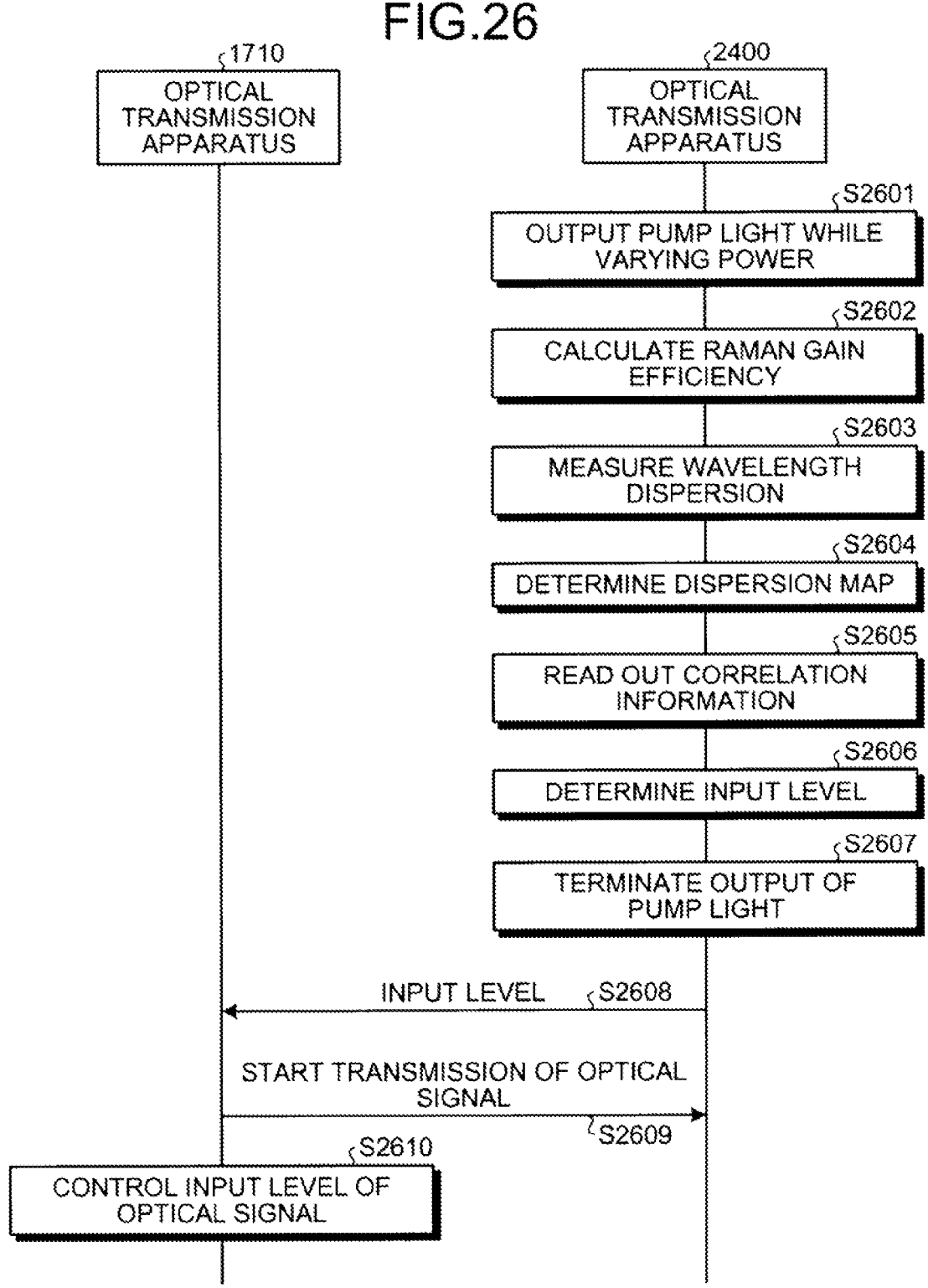

OPTICAL TRANSMISSION APPARATUS, OPTICAL TRANSMISSION SYSTEM, AND OPTICAL TRANSMISSION METHOD

CROSS REFERENCE TO RELATED APPLICATIONS

This application is based upon and claims the benefit of priority of the prior Japanese Patent Application No. 2009-209545, filed on Sep. 10, 2009, the entire contents of which are incorporated herein by reference.

FIELD

The embodiments discussed herein are related to an optical transmission apparatus, an optical transmission system, and an optical transmission method.

BACKGROUND

In recent years, with increasing volumes of information, advances of optical transmission systems have progressed, enabling larger capacities and longer transmission distances (see, e.g., Japanese Laid-Open Patent Publication No. 2006-245343). With increases in the scale of the optical transmission systems, the point of focus has become the maintenance and improvement of transmission performance, prompting applications of various techniques, such as adoption of a low-noise repeater amplifier and error correction at a transceiving apparatus. For better transmission performance (transmission quality), improving Optical Signal Noise Ratio (OSNR) after transmission and suppressing optical waveform deterioration during transmission have become points of interest. Optical waveform deterioration during transmission is caused by, for example, an interaction between wavelength dispersion occurring in a transmission fiber and non-linear phenomena such as self phase modulation, cross phase modulation, and four wave mixing.

With the conventional art, although a higher input level (transmission level) of an optical signal to a transmission fiber at the transmission-side leads to an improvement in the OSNR, a deterioration in waveform occurs as well, making it difficult to determine the input level that improves transmission performance. The input level that improves transmission performance varies depending on the type of a transmission fiber, etc. This poses a problem of difficulty in improving transmission performance.

SUMMARY

According to an aspect of an embodiment, an optical transmission apparatus in an optical transmission system that transmits an optical signal through a transmission fiber includes a measurement device that measures Raman gain efficiency of the transmission fiber; a level determiner that determines an input level of the optical signal based on Raman gain efficiency measured by the measurement device; and a controller that controls a level of the optical signal input to the transmission fiber to become the input level determined by the level determiner.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a graph of the relation between Raman gain efficiency and a proper input level.

FIG. 12 depicts an example of correlation information concerning the correlation between Raman gain efficiency and proper input level.

FIG. 13 is a flowchart of an example of operation of the optical transmission apparatus of FIG. 1.

FIG. 14 depicts a configuration of an optical transmission apparatus according to a second embodiment.

FIG. 16 is a flowchart of an example of operation of the optical transmission apparatus of FIG. 14.

FIG. 17 depicts a configuration of an optical transmission apparatus according to a third embodiment.

FIG. 18 is a modification of the optical transmission apparatus of FIG. 17.

FIG. 19 is a sequence diagram of an example of operation of the optical transmission system of FIG. 17.

FIG. 20 depicts a configuration of an optical transmission apparatus according to a fourth embodiment.

FIG. 21 depicts an example of correlation information concerning the correlation between Raman gain efficiency and the type of a fiber.

FIG. 26 is a sequence diagram of an example of operation of the optical transmission system of FIG. 24.

DESCRIPTION OF EMBODIMENTS

Preferred embodiments of the present invention will be explained with reference to the accompanying drawings.

Figure 1:
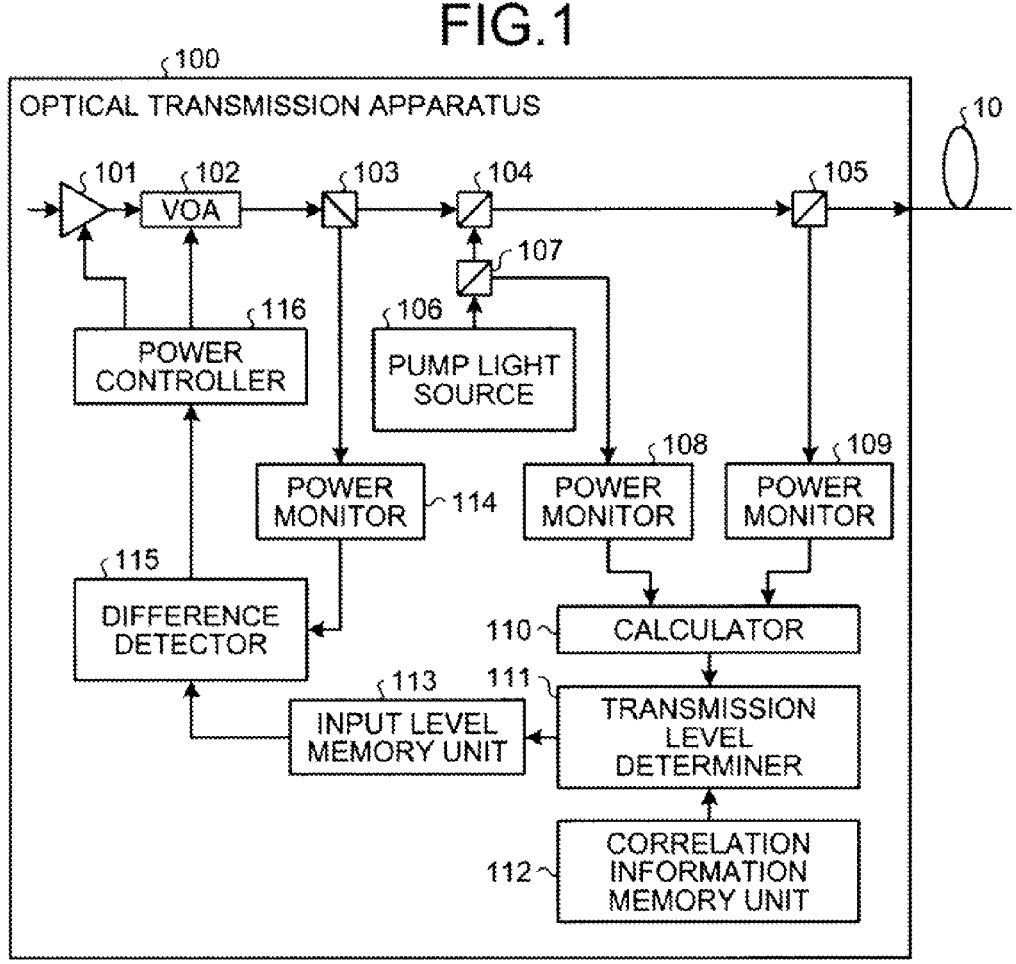
FIG. 1 is a schematic depicting an exemplary configuration of an optical transmission apparatus according to a first embodiment.

FIG. 1 is a schematic depicting an exemplary configuration of an optical transmission apparatus according to a first embodiment. An optical transmission apparatus 100 of the first embodiment is an optical transmission apparatus on the transmission-side of an optical transmission system that transmits an optical signal through a transmission fiber 10, which is an optical fiber.

The optical transmission apparatus 100 includes an amplifier 101, a variable optical attenuator (VOA) 102, optical couplers 103 to 105, a pump light source 106, an optical coupler 107, power monitors 108 and 109, a calculator 110, a transmission level determiner 111, a correlation information memory unit 112, an input level memory unit 113, a power monitor 114, a difference detector 115, and a power controller 116.

The amplifier 101 receives an optical signal transmitted thereto from upstream. For example, when the optical transmission apparatus 100 is used as a repeater apparatus, the amplifier 101 receives an optical signal transmitted from an optical transmission apparatus upstream to the optical transmission apparatus 100. When the optical transmission apparatus 100 is used as a transmitting apparatus, the amplifier 101 receives an optical signal generated by a circuit upstream to the amplifier 101. The amplifier 101 amplifies the optical signal input thereto and outputs the amplified optical signal to the variable optical attenuator 102.

The variable optical attenuator 102 attenuates the optical signal output from the amplifier 101 at a variable attenuation rate, and outputs the attenuated optical signal to the optical coupler 103. The attenuation rate at the variable optical attenuator 102 is controlled by the power controller 116. The optical coupler 103 outputs the optical signal from the variable optical attenuator 102, to the optical coupler 104 and to the power monitor 114. The optical coupler 104 outputs the optical signal from the optical coupler 103 and pump light from the optical coupler 107, to the optical coupler 105.

The optical coupler 105 inputs light from the optical coupler 104, to the transmission fiber 10. The light input into the transmission fiber 10 from the optical coupler 105 propagates through the transmission fiber 10 to an optical transmission apparatus downstream from the optical transmission apparatus 100. The optical coupler 105 outputs light that has traveled back through the transmission fiber 10 to the optical transmission apparatus 100, to the power monitor 109.

The pump light source 106, the power monitors 108 and 109, and the calculator 110 implement a measurement device that measures Raman gain efficiency (nonlinearity) of the transmission fiber 10. For example, the pump light source (excitation unit) 106 generates pump light and outputs the generated light to the optical coupler 107. Pump light generated by the pump light source 106 may be continuous light or modulated light, which is, for example, pump light similar in wavelength band to an optical signal transmitted by the optical transmission apparatus 100. The pump light source 106 outputs pump light while varying the power under the control of a control circuit of the optical transmission apparatus 100.

The optical coupler 107 outputs the pump light from the pump light source 106, to the optical coupler 104 and to the power monitor 108. The power monitor (first monitor) 108 monitors the power of pump light that is input to the transmission fiber 10. For example, the power monitor 108 monitors the power of the pump light output from the optical coupler 107 and outputs a monitoring result to the calculator 110.

The power monitor (second monitor) 109 monitors the power of amplified optical noise generated in the transmission fiber 10 by using the input pump light. For example, when pump light from the pump light source 106 is input to the transmission fiber 10, amplified optical noise generated by a spontaneous Raman scattering phenomenon arising in the transmission fiber 10 travels back to the optical transmission apparatus 100.

The power monitor 109 monitors the amplified optical noise by monitoring the power of the light output from the optical coupler 105. Amplified optical noise monitored by the power monitor 109 represents Raman gain (stimulated Raman scattering gain) at the transmission fiber 10. The power monitor 109 outputs a monitoring result to the calculator 110.

The calculator 110 calculates the Raman gain efficiency of the transmission fiber 10, based on monitoring results output from the power monitors 108 and 109. For example, the calculator 110 calculates the ratio of a monitoring result from the power monitor 109 to a monitoring result from the power monitor 108 to calculate the Raman gain efficiency. The calculator 110 outputs the calculated Raman gain efficiency to the transmission level determiner 111.

The calculator 110 may have a function of a loss calculator that calculates connection loss (lump loss) between the optical transmission apparatus 100 (the apparatus in which calculator 110 is incorporated) and the transmission fiber 10. The calculator 110 calculates connection loss, based on monitoring results from the power monitors 108 and 109, and outputs the calculated connection loss to the transmission level determiner 111.

The transmission level determiner 111 determines the input level of an optical signal to the transmission fiber 10, based on the Raman gain efficiency output from the calculator 110. For example, correlation information concerning the correlation between Raman gain efficiency and input level is stored in the correlation information memory unit 112. The transmission level determiner 111 reads out the correlation information from the correlation information memory unit 112, and determines an input level, based on the correlation information and on the Raman gain efficiency output from the calculator 110.

The transmission level determiner 111 may temporarily determine an input level, based on Raman gain efficiency output from the calculator 110 and correct the temporarily determined input level, based on connection loss output from the calculator 110, to properly determine an input level. The transmission level determiner 111 outputs the determined input level to the input level memory unit 113.

The input level memory unit 113 stores therein the input level output from the transmission level determiner 111. The power monitor 114 monitors the power of the optical signal from the optical coupler 103, and outputs a monitoring result to the difference detector 115. The difference detector 115 reads out an input level stored in the input level memory unit 113, and detects a difference between the input level read out from the input level memory unit 113 and the monitoring result output from the power monitor 114. The difference detector 115 outputs the detected difference to the power controller 116.

The power controller 116 controls the attenuation rate of the variable optical attenuator 102 so as to reduce the difference output from the difference detector 115, enabling control of the optical signal input to the transmission fiber 10 to become the input level determined by the transmission level determiner 111. Although a configuration in which the optical signal level is controlled by the variable optical attenuator 102 has been described in this example, the optical signal level may be controlled by adjusting gain of the amplifier 101 provided as a variable gain amplifier, by the power controller 116.

The calculator 110, the transmission level determiner 111, the difference detector 115, and the power controller 116 are implemented by, for example, processing units, such as digital signal processor (DSP). The correlation information memory unit 112 and the input level memory unit 113 are each implemented by a memory.

The optical transmission apparatus 100 may further include an output unit that outputs the connection loss calculated by the calculator 110. For example, the output unit implements an interface that outputs the calculated loss calculation to a user. For example, the output unit outputs a result of comparison between the connection loss calculated by the calculator 110 and a threshold. For example, when the connection loss calculated by the calculator 110 exceeds the threshold, the output unit outputs a warning to the user, enabling the user to know that the connection loss has exceeded the threshold.

OSNR [dB] after transmitted through the transmission fiber 10 and amplifier 101 by the optical transmission apparatus 100 is given by, for example, equation (1).

$$ONSR = Pin - Loss - NF + h \cdot \upsilon \cdot \Delta f \tag{1}$$

In equation (1), Pin denotes the input level of an optical signal to the transmission fiber 10, Loss denotes span loss of the optical signal in the transmission fiber 10, NF (Noise Figure) denotes a noise index of the amplifier 101, constant h is the Planck constant, $\upsilon$ denotes a optical frequency, and $\Delta f$ denotes a normalized band.

Figure 2:
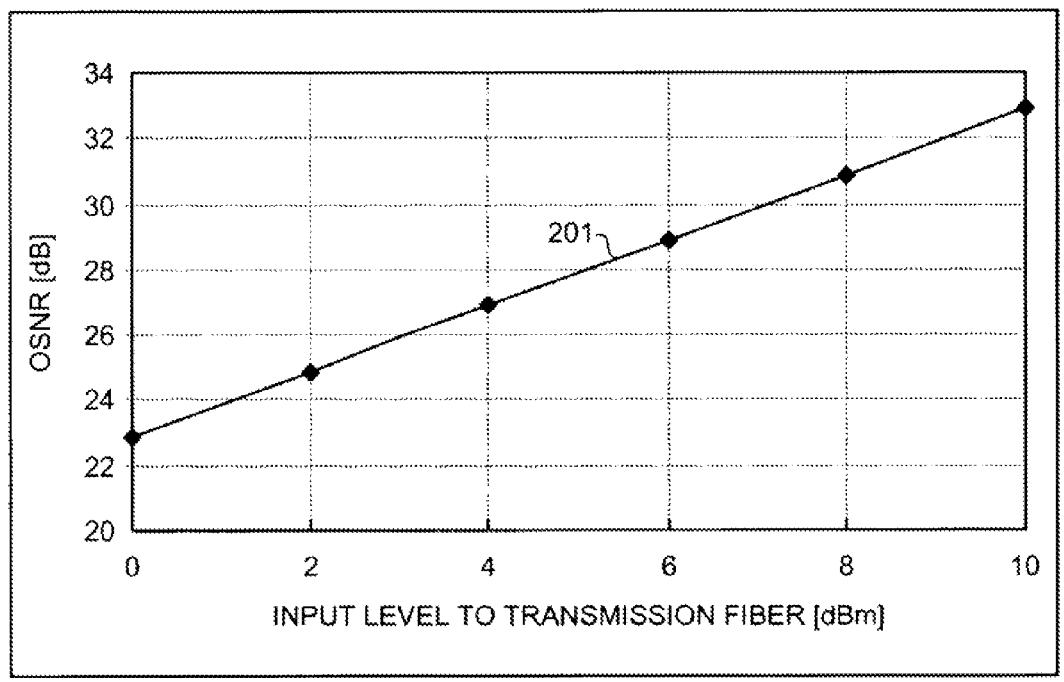
FIG. 2 is a graph of the relation between input level to a transmission fiber and OSNR.

FIG. 2 is a graph of the relation between input level to the transmission fiber and OSNR. In FIG. 2, the horizontal axis represents the input level [dBm] of signal light input to the transmission fiber 10 and the vertical axis represents OSNR [dB] after transmission. The OSNR plotted along the vertical axis indicates that the greater the OSNR is, the higher transmission performance is.

A curve 201 represents an example of calculation of an OSNR after transmission for the input level Pin of equation (1), where the span loss is determined to be 30 [dB] and the NF of the amplifier 101 is determined to be 5 [dB]. As indicated by equation (1) and the curve 201, OSNR after transmission improves as the input level Pin is increased.

Figure 3:
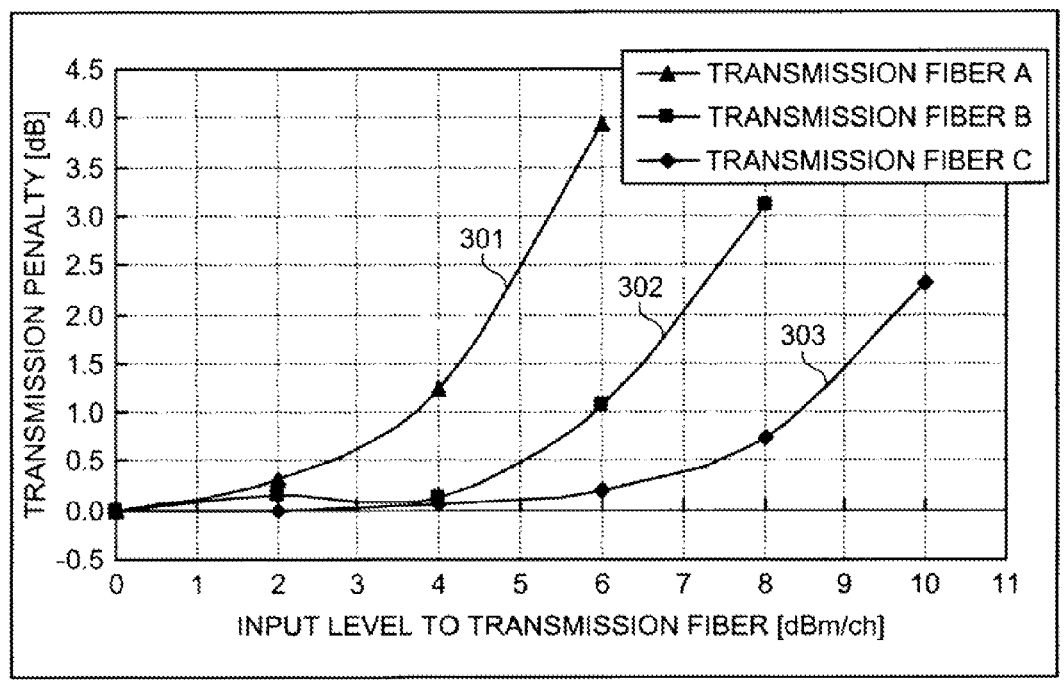
FIG. 3 is a graph of the relation between the input level to the transmission fiber and transmission penalty.

FIG. 3 is a graph of the relation between input level to the transmission fiber and transmission penalty. In FIG. 3, the horizontal axis represents the input level [dBm/ch] of an optical signal input to the transmission fiber 10 and the vertical axis represents the transmission penalty [dB] after transmission through the transmission fiber 10. The transmission penalty plotted along the vertical axis represents waveform deterioration, indicating that the greater the transmission penalty is, the lower transmission performance is. The transmission penalty represents the extent of transmission performance deterioration in the presence of waveform deterioration caused by a nonlinear phenomenon in the transmission fiber 10 with respect to transmission performance in the absence of waveform deterioration caused by a nonlinear phenomenon in the transmission fiber 10.

Curves 301 to 303 represent an example of calculation of transmission penalty after transmission through each fiber with respect to the input level Pin, for each of transmission fibers A to C in signal transmission by the same modulating method. The transmission fibers A to C are the transmission fibers used as the transmission fiber 10, and differ from each other in terms of effective sectional area Aeff and a loss coefficient α.

As depicted by the curves 301 to 303, the transmission penalty gets larger as the input level Pin is increased. Further, as depicted by the curves 301 to 303, even when an optical signal modulated by the same modulating method is transmitted, the frequency of occurrence of nonlinear phenomena varies depending on parameters of the transmission fiber 10, such as the effective sectional area Aeff and the loss coefficient α. Hence, the extent of waveform deterioration varies depending on the parameters of the transmission fiber 10.

Figure 4:
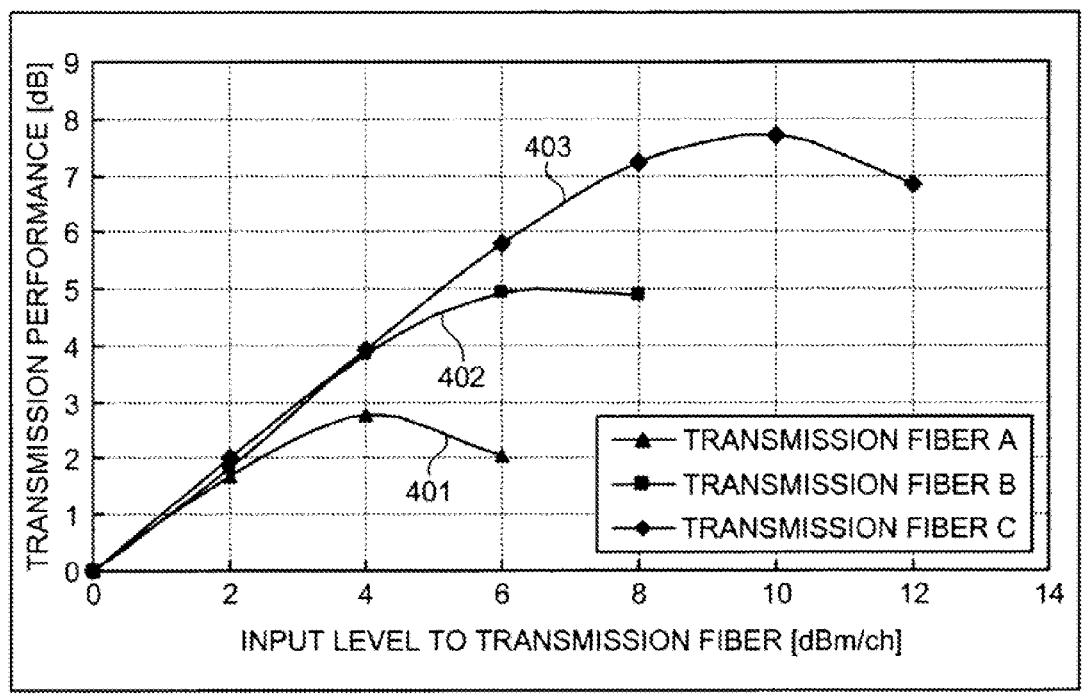
FIG. 4 is a graph of the relation between the input level to the transmission fiber and transmission performance.

FIG. 4 is a graph of the relation between the input level to the transmission fiber and transmission performance. In FIG. 4, the horizontal axis represents the input level [dBm/ch] of an optical signal input to the transmission fiber 10 and the vertical axis represents transmission performance [dB] after transmission. The transmission performance plotted along the vertical axis is the transmission performance given by combining OSNR represented by the vertical axis of FIG. 2 with the transmission penalty represented by the vertical axis of FIG. 3. Curves 401 to 403 represent an example of calculation of transmission performance with respect to the input level Pin, in each of the transmission fibers A to C.

As described above, OSNR improves as the input level Pin is increased, and the transmission penalty increases as the input level Pin is increased. This means that OSNR and the transmission penalty have a mutual relation of trade-off with respect to a change in the input level Pin. As a result, the input level Pin at which the transmission performance as a combination of OSNR and the transmission penalty is maximized exists, as depicted in the curves 401 to 403.

As depicted by the curves 401 to 403, the input level Pin at which the transmission performance is maximized varies depending on parameters of the transmission fiber 10. For example, when the transmission fiber A is used, the transmission performance is maximized when the input level Pin is about 4 [dBm/ch]. When the transmission fiber B is used, the transmission performance is maximized when the input level Pin is about 6.2 [dBm/ch]. When the transmission fiber C is used, the transmission performance is maximized when the input level Pin is about 10 [dBm/ch].

Figure 5:
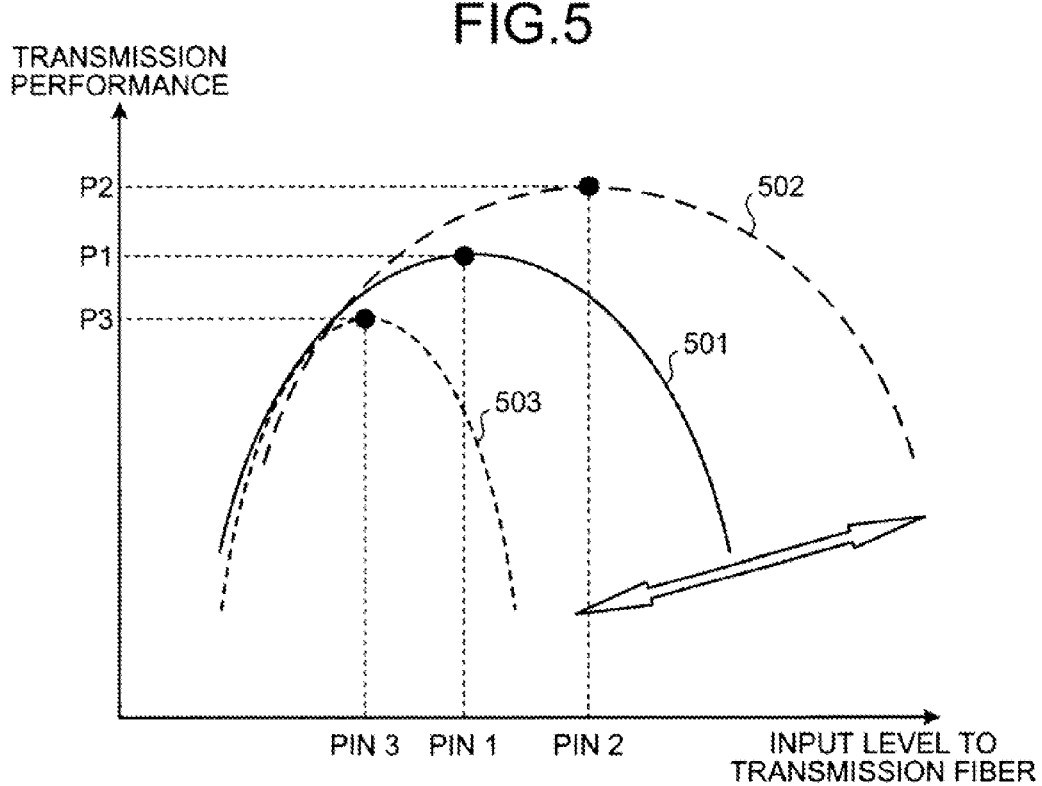
FIG. 5 is a graph of manufacturing variation with respect to the relations of FIG. 4.

FIG. 5 is a graph of the manufacturing variation with respect to the relations of FIG. 4. In FIG. 5, the horizontal axis represents the input level of an optical signal to the transmission fiber 10 and the vertical axis represents transmission performance. A curve 501 represents the relation between the input level Pin and transmission performance for a transmission fiber free from manufacturing variation and used as the transmission fiber 10. For the curve 501, the input level Pin at which the transmission performance is maximized is expressed as Pin1, and the transmission performance achieved at the input level Pin1 is expressed as transmission performance P1.

Curves 502 and 503 respectively represent the relation between the input level Pin and transmission performance for a transmission fiber having manufacturing variation and used as the transmission fiber 10. For the curve 502, the input level Pin at which the transmission performance is maximized is expressed as Pin2, and the transmission performance achieved at the input level Pin2 is expressed as transmission performance P2. For the curve 503, the input level Pin at which the transmission performance is maximized is expressed as Pin3, and the transmission performance achieved at the input level Pin3 is expressed as transmission performance P3.

As depicted by the curve 502, it is more difficult for waveform deterioration to occur as compared to the relation represented by the curve 501. As a result, the input level Pin2 is higher than the input level Pin1. As depicted by the curve 503, waveform deterioration due to a nonlinear phenomenon occurs more easily than for the relation represented by the curve 501. As a result, the input level Pin3 is lower than the input level Pin1. In this manner, the input level Pin at which the transmission performance is maximized differs depending on parameter variations of the transmission fiber 10 resulting from manufacturing variation. Thus, by setting an optimum input level for each span with consideration of manufacturing variation, transmission performance is improved for a transmission path fiber that is actually implemented.

Figure 6:
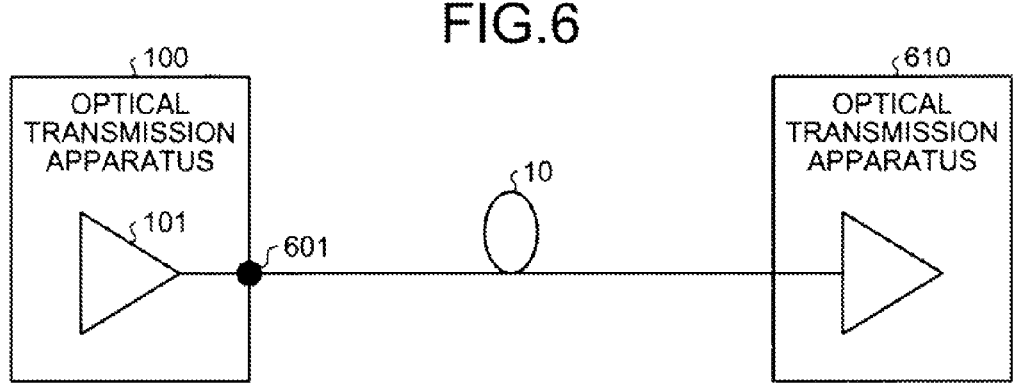
FIG. 6 is a diagram of connection loss at an incident end.

FIG. 6 is a diagram of connection loss at an incident end. FIG. 6 is a simplified view of the optical transmission apparatus 100 of FIG. 1. An optical transmission apparatus 610 receives the optical signal transmitted from the optical transmission apparatus 100. An incident end connection point 601 is a portion at which the optical signal, which has been amplified by the amplifier 101, enters the transmission fiber 10. At the incident end connection point 601, connector and splice connections are carried out often in adjustment to fiber arrangement in a station, allowing connection loss to happen easily at the incident end connection point 601.

Figure 7:
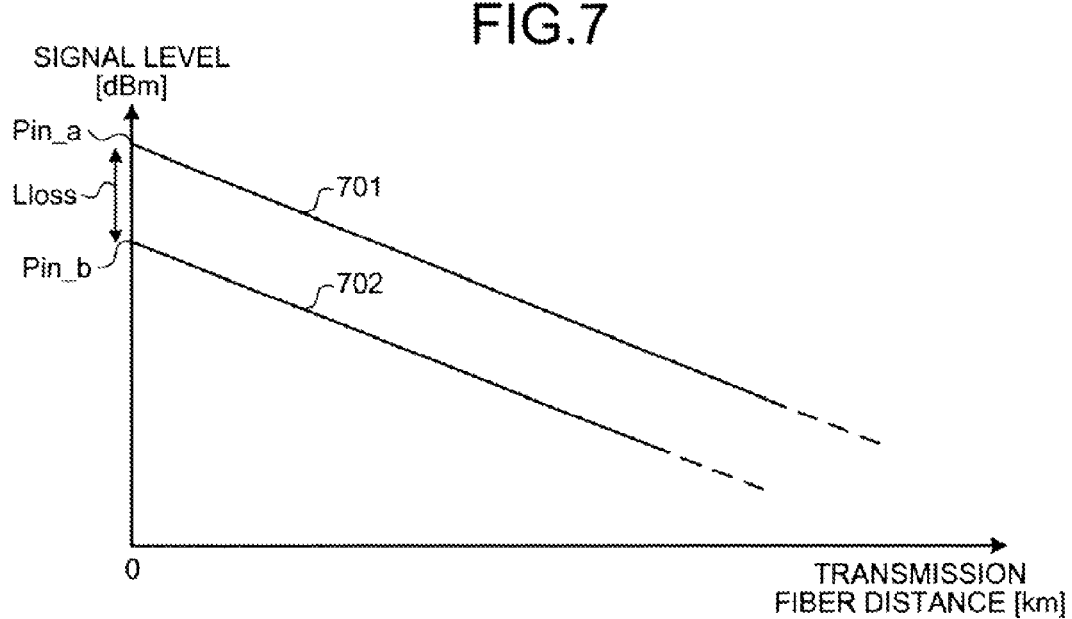
FIG. 7 is another diagram related to connection loss at the incident end.

FIG. 7 is another diagram related to connection loss at the incident end. In the diagram of FIG. 7, the horizontal axis represents the distance [km] of the transmission fiber 10 and the vertical axis represents the signal level [dBm] of an optical signal propagating through the transmission fiber 10. A curve 701 represents the relation between the distance of the transmission fiber 10 and the signal level in the absence of connection loss at the incident end connection point 601. The signal level at the incident end connection point 601 (distance of the transmission fiber 10=0 [km]) in the curve 701 is expressed as Pin_a.

A curve 702 represents the relation between the distance of the transmission fiber 10 and the signal level in the presence of connection loss at the incident end connection point 601. The signal level at the incident end connection point 601 (distance of the transmission fiber 10=0 [km]) in the curve 702 is expressed as Pin_b. The signal level Pin_b is lower than the signal level Pin_a by a connection loss Lloss, i.e., in the presence of connection loss at the incident end connection point 601, the level of an optical signal, which is subjected to signal level control by the variable optical attenuator 102, drops by the connection loss Lloss at the incident end connection point 601.

Raman gain Ga monitored by the power monitor 109 is given by, for example, equation (2). In equation (2), $g_R$ denotes a Raman gain coefficient [m/W], Po denotes the power [W] of pump light input to the transmission fiber 10, Leff denotes the effective length [m] of the transmission fiber 10, and Aeff denotes the effective sectional area [m$^2$] of the transmission fiber 10.

$$Ga = \exp(g_R \cdot Po \cdot \text{Leff}/\text{Aeff}) \quad (2)$$

The Raman gain efficiency (Raman amplification efficiency) of the transmission fiber 10 that is calculated by the calculator 110 can be expressed by the ratio Ga/Po between the Raman gain Ga and the power Po. From equation (2), it is found that the Raman gain efficiency Ga/Po is determined depending on Leff/Aeff, which is a parameter of the transmission fiber 10.

Figure 8:
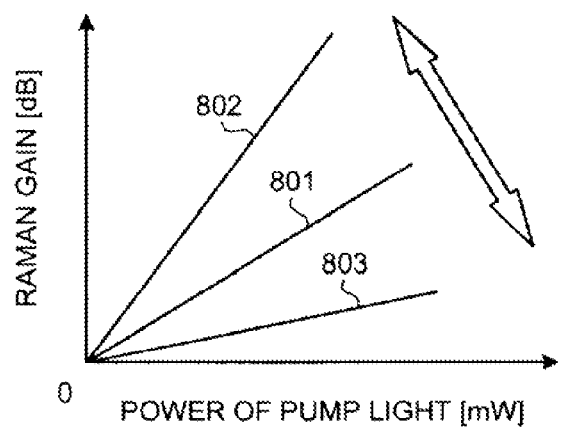
FIG. 8 is a graph of the relation between the power of pump light and Raman gain (in the absence of connection loss).

FIG. 8 is a graph of the relation between the power of pump light and Raman gain (in the absence of connection loss). In FIG. 8, the horizontal axis represents the power Po [mW] of pump light input to the transmission fiber 10 and the vertical axis represents the Raman gain Ga [dB]. FIG. 8 depicts the relation in the absence of the connection loss Lloss at the incident end connection point 601.

The gradients of curves 801 to 803 representing the relation between pump light power Po and Raman gains Ga represent each Raman gain efficiency Ga/Po, which is dependent on Leff/Aeff. A control circuit of the optical transmission apparatus 100, for example, causes the pump light source 106 to output pump light at the start of the optical transmission apparatus 100 (before transmission of an optical signal). At this time, the control circuit of the optical transmission apparatus 100 causes the pump light source 106 to change the pump light power Po. This allows the calculator 110 to acquire the Raman gain Ga for each power Po.

The calculator 110 calculates the ratio of the Raman gain Ga to the power Po, based on the acquired Raman gain Ga for each power Po, to calculate an approximation to the Raman gain efficiency Ga/Po (e.g., any one of the curves 801 to 803). The transmission level determiner 111 is thus able to determine the input level Pin, based on the Raman gain efficiency Ga/Po calculated by the calculator 110 and on correlation information in the correlation information memory unit 112.

Figure 9:
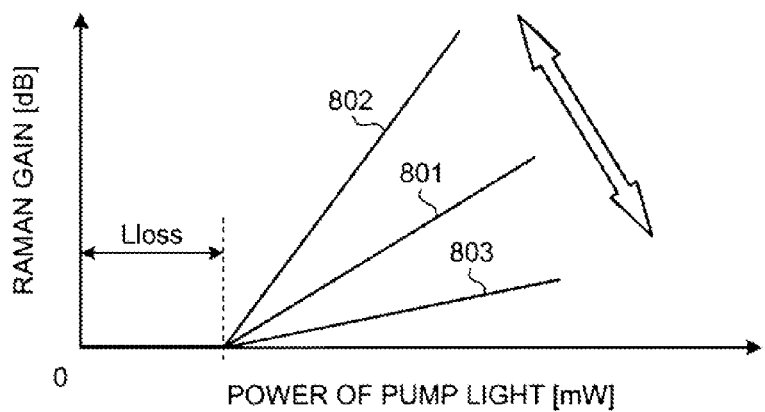
FIG. 9 is a graph of the relation between the power of pump light and Raman gain (in the presence of connection loss).

FIG. 9 is a graph of the relation between the power of pump light and Raman gain (in the presence of connection loss). In FIG. 9, constituent elements similar to those described in FIG. 8 are denoted by the same reference numerals used in FIG. 8 and description thereof is omitted. FIG. 9 depicts the relation between the power of pump light and a Raman gain in the presence of the connection loss Lloss at the incident end connection point 601. When the connection loss Lloss is present at the incident end connection point 601, pump light attenuates to lose power Po in the amount equivalent to the connection loss Lloss, and is input to the transmission fiber 10 as attenuated light.

As a result, the curves 801 to 803 shift by an extent equivalent to the connection loss Lloss, as depicted in FIG. 9. For example, in the range in which the pump light power Po is equal to or less than the connection loss Lloss at the incident end connection point 601, an increase in the pump light power Po does not result in the occurrence of a nonlinear phenomenon in the transmission fiber 10, thus causing no Raman gain Ga. In the range in which the pump light power Po is more than the connection loss Lloss at the incident end connection point 601, the gradients of the curves 801 to 803 are similar to the gradients of the curves 801 to 803 of FIG. 8.

The calculator 110 calculates the connection loss Lloss at the incident end connection point 601, based on the acquired Raman gain Ga for each power Po. For example, the calculator 110 specifies the range of the power Po in which the Raman gain Ga does not increase, and calculates the size of the specified range as the connection loss Lloss.

The calculator 110 also calculates the Raman gain efficiency Ga/Po for the range in which the pump light power Po is more than the connection loss Lloss. For example, the calculator 110 acquires the Raman gain Ga for each power Po in the range in which the power Po is more than the connection loss Lloss, and calculates an approximation to the Raman gain efficiency Ga/Po, based on the acquired Raman gain Ga for each power Po.

The transmission level determiner 111 temporarily determines the input level Pin, based on the Raman gain efficiency Ga/Po calculated by the calculator 111 and on correlation information in the corresponding information memory unit 112, and corrects the temporarily determined input level Pin using the connection loss Lloss. For example, the transmission level determiner 111 adds the connection loss Lloss to the temporarily determined input level Pin to correct the temporarily determined input level Pin. The transmission level determiner 111 transmits the corrected input level Pin to the input level memory unit 113.

Figure 10:
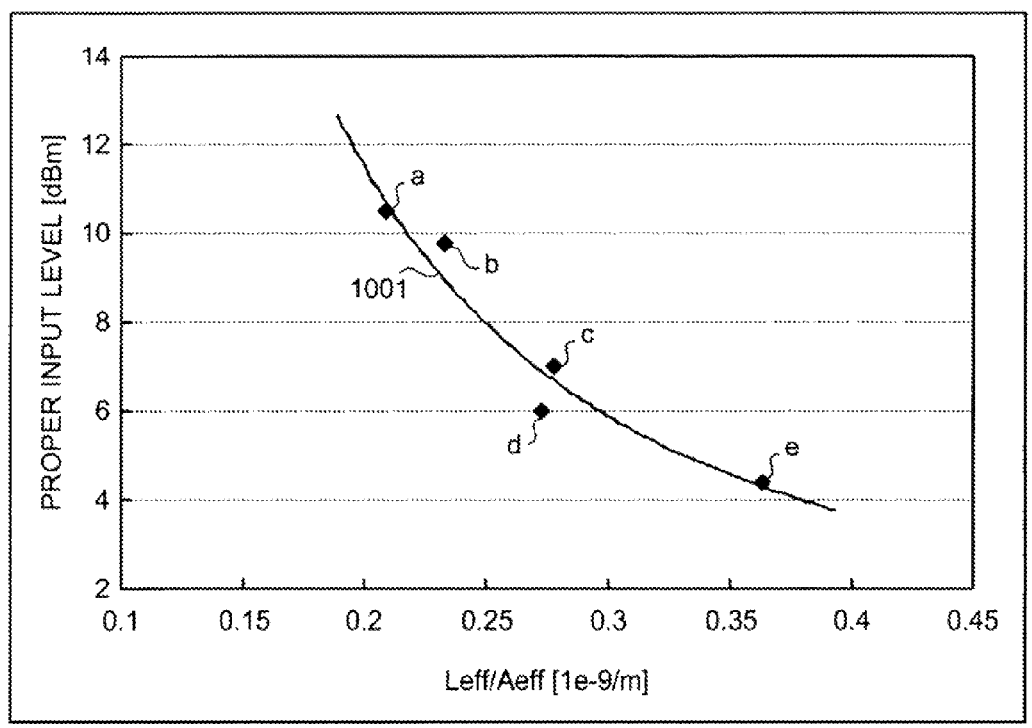
FIG. 10 is a graph of the relation between parameter of the transmission fiber and proper input level.

FIG. 10 is a graph of the relation between parameter of the transmission fiber and proper input level. In FIG. 10, the horizontal axis represents the parameter Leff/Aeff [1e−9/m] of the transmission fiber 10 and the vertical axis represents the proper input level Pin [dBm]. Plotted points a to e in FIG. 10 represent an example of calculation of proper input levels Pin for the parameter Leff/Aeff of the transmission fiber 10. A curve 1001 represents an approximation to the plotted points.

As depicted in FIG. 10, the parameter Leff/Aeff of the transmission fiber 10 has a correlation with the proper input level Pin. For example, when Leff is small (i.e., loss coefficient α is large) or Aeff is large, it is difficult for a nonlinear phenomenon to occur in the transmission fiber 10 and consequently, transmission performance is maximized at a relatively high input level Pin.

On the other hand, when Leff is large (i.e., loss coefficient α is small) or Aeff is small, a nonlinear phenomenon easily occurs in the transmission fiber 10 and consequently, transmission performance is maximized at a relatively low input level Pin. In this manner, the Raman gain efficiency Ga/Po depends on Leff/Aeff, which is correlated with the proper input level Pin. The transmission level determiner 110 is, therefore, able to determine the proper input level Pin, based on the Raman gain efficiency Ga/Po.

For example, correlation information correlating the Raman gain efficiency Ga/Po with the proper input level Pin is stored in advance in the correlation information memory unit 112 of the optical transmission apparatus 100. The transmission level determiner 111 determines the proper input level Pin, based on the Raman gain efficiency Ga/Po output from the calculator 110 and on the correlation information stored in the correlation information memory unit 112.

FIG. 11 is a graph of the relation between Raman gain efficiency and a proper input level. In FIG. 11, the horizontal axis represents the Raman gain efficiency Ga/Po [dB/mW] and the vertical axis represents the proper input level Pin [dBm/ch] (e.g., input level Pin at which transmission performance is maximized). Plotted points a to e in FIG. 11 represent an example of calculation of proper input levels Pin for the Raman gain efficiency Ga/Po, each corresponding to each of the plotted points a to e of FIG. 10.

FIG. 12 depicts an example of correlation information concerning the correlation between Raman gain efficiency and proper input level. A table 1200 of FIG. 12 depicts an example of correlation information stored in the correlation information memory unit 112. In the table 1200, the Raman gain efficiency Ga/Po (Ga_1 to Ga_N) is correlated with the proper input level Pin (Pin_1 to Pin_N).

Each line of the table 1200, for example, represents each of the plotted points a to e of FIG. 11. Each Raman gain efficiency Ga/Po (Ga_1 to Ga_N) may represent, for example, each range of the Raman gain efficiency Ga/Po, e.g., $Ga/P_o$=0.010 to 0.015 [dB/mW], Ga/Po=0.015 to 0.020 [dB/mW], etc.

The transmission level determiner 111 acquires the input level Pin correlated in the table 1200 with the Raman gain efficiency Ga/Po output from the calculator 110, and outputs the acquired input level Pin to the input level memory unit 113.

The relation between the Raman gain efficiency Ga/Po and the proper input level Pin varies depending on parameters, such as the type of an optical signal to be transmitted, the number of transmission spans, a dispersion map, and the NF of the amplifier 101. For this reason, a table 1200 may be stored in the correlation information memory unit 112 for each parameter. In such a case, the transmission level determiner 111 acquires a relevant table 1200 corresponding to a given parameter, from among plural tables 1200, and determines the input level Pin based on the acquired table 1200.

Correlation information stored in the correlation information memory unit 112 is not limited to the table 1200 and may be any type of information that correlates the Raman gain efficiency Ga/Po with the proper input level Pin. For example, a relational equation (approximate equation) indicative of the relation between the Raman gain efficiency Ga/Po and the proper input level Pin may be stored as correlation information in the correlation information memory unit 112. In such a case, the transmission level determiner 111 calculates the input level Pin, based on the relational equation stored in information memory unit 112 and on the Raman gain efficiency Ga/Po, to determine the input level Pin.

FIG. 13 is a flowchart of an example of the operation of optical transmission apparatus of FIG. 1. The optical transmission apparatus 100, for example, carries out the following operation under the control of the control circuit of the optical transmission apparatus 100. At the start of the optical transmission apparatus 100 (step S1301), the pump light source 106 outputs pump light while varying the power thereof (step S1302).

Subsequently, the calculator 110 calculates the Raman gain efficiency Ga/Po and the connection loss Lloss, based on monitoring results obtained by the power monitors 108 and 109 during the output of pump light at step S1302. The transmission level determiner 111 reads out correlation information from the correlation information memory unit 112 (step S1304).

The transmission level determiner 111 temporarily determines the input level Pin, based on the Raman gain efficiency Ga/Po calculated at step S1303 and on the correlation information read out at step S1304 (step S1305). The transmission level determiner 111 corrects the input level Pin temporarily determined at step S1305, based on the connection loss Lloss calculated at step S1303 (step S1306).

Subsequently, the pump light source 106 stops outputting pump light (step S1307), which is followed by the start of transmission of an optical signal amplified by the amplifier 101 to an optical transmission apparatus downstream (step S1308). The power controller 116 then controls the input level of the optical signal to the transmission fiber 10 to become the input level Pin corrected at step S1306 (step S1309), and a series of the operations comes to an end. Afterward, the power controller 116 may continue input level control carried out at step S1309.

While an example of stopping output of pump light at transmission of an optical signal is described, pump light may continue to be output during transmission of an optical signal to transmit the optical signal while amplifying it by Raman amplification. In such a case, for example, the power of pump light output from the pump light source 106 is made constant at transmission of the optical signal, enabling measurement of the Raman gain efficiency Ga/Po of the transmission fiber 10 using the configuration of the pump light source 106 used for Raman amplification of the optical signal.

In this manner, the optical transmission apparatus 100 of the first embodiment measures the Raman gain efficiency Ga/Po of the transmission fiber 10, and determines the input level Pin of an optical signal based on the result of the measurement. Because the proper input level Pin of an optical signal to the transmission fiber 10 depends on the Raman gain efficiency Ga/Po, transmission performance can be improved by determining the input level Pin based on the result of measurement of the Raman gain efficiency Ga/Po.

FIG. 14 depicts a configuration of an optical transmission apparatus according to a second embodiment. In FIG. 14, constituent elements similar to those described in FIG. 1 are denoted by the same reference numerals used in FIG. 1 and description thereof is omitted. An optical transmission apparatus 1400 of the second embodiment is an optical transmission apparatus in a wavelength division multiplexing (WDM) transmitting system that transmits optical signals through wavelength channels ch1 to chn.

As depicted in FIG. 14, the optical transmission apparatus 1400 includes a variable optical attenuating unit 1410, optical couplers 1421 to 142*n*, a wavelength multiplexing unit 1430, and a power monitor 1440, in addition to the configuration of the optical transmission apparatus 100 of FIG. 1. The variable optical attenuating unit 1410 receives optical signals from the wavelength channels ch1 to chn. The variable optical attenuating unit 1410 has variable optical attenuators 1411 to 141*n* that correspond to the wavelength channels ch1 to chn, respectively.

The variable optical attenuators 1411 to 141*n* respectively attenuate an incoming signal from the wavelength channels ch1 to chn at variable attenuation rates. The ratio between the attenuation rates of the variable optical attenuators 1411 to 141*n* is controlled by the power controller 116. The variable optical attenuators 1411 to 141*n* output the attenuated optical signals to the optical couplers 1421 to 142*n*, respectively.

The optical couplers 1421 to 142*n* output the optical signals from the variable optical attenuators 1411 to 141*n*, to the wavelength multiplexing unit 1430 and to the power monitor 1440. The wavelength multiplexing unit 1430 multiplexes the optical signals from the optical couplers 1421 to 142*n* by wavelength multiplexing, and outputs the resulting multiplexed optical signal to the amplifier 101, which amplifies the multiplexed optical signal from the wavelength multiplexing unit 1430. The power monitor 1440 monitors the ratio between the powers of optical signals output from the variable optical attenuators 1411 to 141*n*, and outputs a monitoring result to the power controller 116.

The pump light source 106 is a variable wavelength light source that is controlled by the control circuit to change the wavelength of pump light. The power monitors 108 and 109 and the calculator 110 carry out measurement of the Raman gain efficiency Ga/Po for each of the wavelength channels ch1 to chn. The transmission level determiner 111 determines the input level Pin for each of the wavelength channels ch1 to chn. The power controller 116 controls the input level of the optical signals traveling through the wavelength channels ch1 to chn, based on the input level Pin respectively determined for each of the wavelength channels ch1 to chn.

For example, the difference detector 115 reads out each of the input levels Pin for each of the wavelength channels ch1 to chn from the input level memory unit 113. The difference detector 115 then outputs to the power controller 116, a difference between total power given as the total of the input levels Pin read out from the input level memory unit 113 and a monitoring result output from the power monitor 141.

The power controller 116 controls the attenuation rate of the variable optical attenuator 102 such that the difference output from the difference detector 115 decreases. The power controller 116 acquires the ratio between the input levels Pin respectively determined for each wavelength and stored in the input level memory unit 113, and then controls the ratio between attenuation rates of the variable optical attenuators 1411 to 141*n* to bring the acquired ratio closer to the ratio output from the power monitor 1440. In this manner, the level of each optical signal from each of the wavelength channels ch1 to chn can be controlled to become the respective input levels therefor as stored in the input level memory unit 113.

Figure 15:
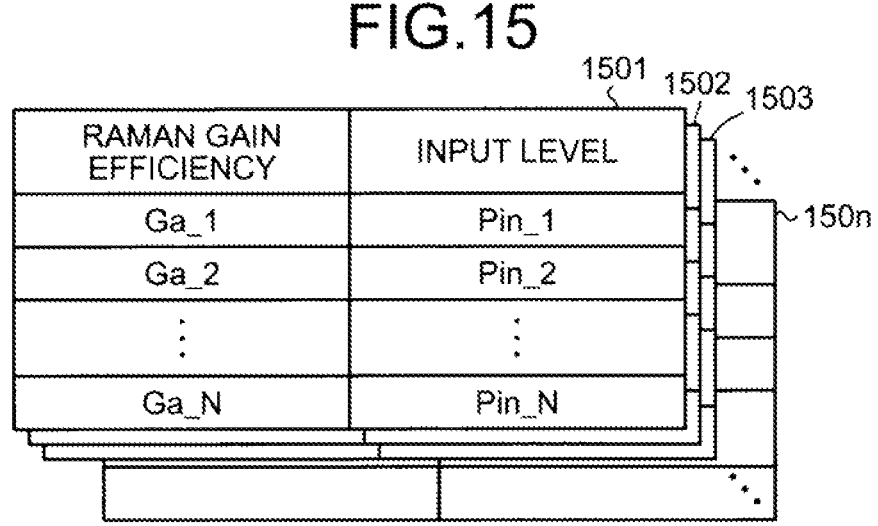
FIG. 15 depicts an example of correlation information for each wavelength channel.

FIG. 15 depicts an example of correlation information for each of the wavelength channels. Tables 1501 to 150*n* of FIG. 15 represent an example of correlation information for each of the wavelength channels ch1 to chn stored in the correlation information memory unit 112 depicted in FIG. 14. In each of the tables 1501 to 150*n*, the Raman gain efficiency Ga/Po (Ga_1 to Ga_N) is correlated with the input level Pin (Pin_1 to Pin_N), as in the table 1200 of FIG. 12.

The transmission level determiner 111 reads out a table corresponding to the wavelength of pump light output from the pump light source 106, from the tables 1501 to 150*n*. The transmission level determiner 111 then acquires, from the read out table, the input level Pin correlated with the Raman gain efficiency Ga/Po output from the calculator 110 and outputs the acquired input level Pin to the input level memory unit 113.

FIG. 16 is a flowchart of an example of operation of the optical transmission apparatus of FIG. 14. The optical transmission apparatus 1400, for example, carries out the following operation under the control of the control circuit of the optical transmission apparatus 1400. Steps S1601 to S1606 of FIG. 16 are the same as steps S1301 to S1306 of FIG. 13, and are therefore omitted in further description.

Following correction of the input level Pin at step S1606, whether the input level Pin has been determined for each wavelength channel at steps S1605 and S1606 is determined (step S1607). If the input level Pin has not been determined for each wavelength channel (step S1607: NO), the wavelength of pump light generated by the pump light source 106 is changed to a wavelength of a wavelength channel for which the input level Pin has not been determined yet (step S1608), after which the process flow returns to step S1602.

If the input level Pin has been determined for each wavelength channel at step S1607 (step S1607: YES), the process flow proceeds to step S1609. Steps S1609 to S1611 of FIG. 16 are the same as steps S1307 to S1309 of FIG. 13, and are therefore omitted in further description. At step S1611, however, for each optical signal of each wavelength channel, the input level to the transmission fiber 10 is controlled.

In this manner, the optical transmission apparatus 1400 of the second embodiment in the WDM system that transmits optical signals through plural wavelength channels measures Raman gain efficiency for each wavelength channel to determine the input level Pin for each wavelength channel, enabling the optical transmission apparatus 1400 to control the signal level at each wavelength channel to improve the transmission performance of the signal transmitted through each wavelength channel.

FIG. 17 depicts a configuration of an optical transmission apparatus according to a third embodiment. In FIG. 17, constituent elements similar to those described in FIG. 1 are denoted by the same reference numerals used in FIG. 1 and description thereof is omitted. An optical transmission system 1700 of FIG. 17 is an optical transmission system in which an optical signal is transmitted from an optical transmission apparatus 1710 to an optical transmission apparatus 1720 through a transmission fiber 11.

The optical transmission apparatus 1710 operates at the transmission-side in the optical transmission system 1700. The optical transmission apparatus 1710 includes the amplifier 101, the variable optical attenuator 102, the power monitor 114, the input level memory unit 113, the difference detector 115, and the power controller 116 of FIG. 1, and further includes an optical coupler 1711, and a supervisory channel receiving unit (optical supervisory channel (OSC)) 1712.

The optical coupler 103 inputs light from the variable optical attenuator 102 into the transmission fiber 11. The light output from the optical coupler 103 and input into the transmission fiber 11 propagates through the transmission fiber 11 to reach the optical transmission apparatus 1720. The optical coupler 103 outputs the optical signal from the variable optical attenuator 102, to the power monitor 114.

The optical coupler 1711 outputs the optical signal transmitted from the optical transmission apparatus 1720 to the optical coupler 1711 via a transmission fiber 12, to the supervisory channel receiving unit 1712. The supervisory channel receiving unit 1712 receives an OSC included in the optical signal output from the optical coupler 1711, and outputs the input level Pin included in the received OSC to the input level memory unit 113. The input level memory unit 113 stores therein the input level Pin output from the supervisory channel receiving unit 1712.

The optical transmission apparatus 1720 operates after transmission in the optical transmission system 1700. The optical transmission apparatus 1720 includes the optical couplers 104 and 105, the pump light source 106, the optical coupler 107, the power monitors 108 and 109, the calculator 110, the transmission level determiner 111, and the correlation information memory unit 112 of FIG. 1, and further includes a supervisory channel transmitting unit (OSC) 1721 and an optical coupler 1722.

The optical coupler 104 outputs light transmitted thereto from the optical transmission apparatus 1710 via the transmission fiber 11, to the optical coupler 105. The optical coupler 104 further inputs pump light from the optical coupler 107, into the transmission fiber 11. As a result, amplified optical noise caused by a spontaneous Raman scattering phenomenon arising in the transmission fiber 11 travels back to the optical transmission apparatus 1720, enabling the power monitor (second monitor) 109 to monitor the power of amplified optical noises caused in the optical fiber 11 by pump light input thereto.

The transmission level determiner 111 outputs the determined input level Pin to the supervisory channel transmitting unit 1721. The supervisory channel transmitting unit 1721 outputs to the optical coupler 1722, an OSC that includes the input level Pin output from the transmission level determiner 111. The optical coupler 1722 inputs the incoming OSC from supervisory channel transmitting unit 1721, to the transmission fiber 12. Hence, the OSC is transmitted to the optical transmission apparatus 1710 via the transmission fiber 12.

In this manner, pump light may be input to the transmission fiber 11 in the direction of transmission from the optical transmission apparatus 1720 to the optical transmission apparatus 1710 to enable the optical transmission apparatus 1720 to measure Raman amplification gain of the transmission fiber 11. The optical transmission apparatus 1720 determines the input level Pin, based on the measured Raman amplification gain, and transmits the determined input level Pin to the optical transmission apparatus 1710 to control the level of an optical signal input to the transmission fiber 11.

FIG. 18 is a modification of the optical transmission apparatus of FIG. 17. In FIG. 18, constituent elements similar to those described in FIG. 17 are denoted by the same reference numerals used in FIG. 17 and description thereof is omitted. As depicted in FIG. 18, the optical transmission apparatus 1710 may include optical couplers 1811 and 1812, a pump light source 1813, an optical coupler 1814, power monitors 1815 and 1816, a calculator 1817, a transmission level determiner 1818, a correlation information memory unit 1819, a supervisory channel transmitting unit (OSC) 1820, and an optical coupler 1821, in addition to the configuration of FIG. 17.

The optical couplers 1811 and 1812, the pump light source 1813, the optical coupler 1814, the power monitors 1815 and 1816, the calculator 1817, the transmission level determiner 1818, the correlation information memory unit 1819, the supervisory channel transmitting unit 1820, and the optical coupler 1821 are similar in configuration to the optical couplers 104 and 105, the pump light source 106, the optical coupler 107, the power monitors 108 and 109, the calculator 110, the transmission level determiner 111, the correlation information memory unit 112, the supervisory channel transmitting unit 1721, and the optical coupler 1722 of FIG. 17, respectively.

The optical coupler 1811 receives light transmitted via a transmission fiber 13 from an optical transmission apparatus upstream to the optical transmission apparatus 1710 and outputs the light to the optical coupler 1812. The optical coupler 1812 inputs an OSC from the transmission level determiner 1818, to a transmission fiber 14. As a result, the OSC that includes the input level Pin is transmitted to the optical transmission apparatus upstream to the optical transmission apparatus 1710 via the transmission fiber 14. In this manner, the optical transmission system 1700 of FIG. 17 may be configured as a multistage system.

FIG. 19 is a sequence diagram of an example of operation of the optical transmission system of FIG. 17. The optical transmission apparatus 1710 and the optical transmission apparatus 1720, for example, carry out the following operation. First, the optical transmission apparatus 1720 outputs pump light while varying the power thereof (step S1901). Pump light output at step S1901 is input to the transmission fiber 11. The optical transmission apparatus 1720 then calculates the Raman gain efficiency Ga/Po as pump light continues to be output by the operation at step S1901 (step S1902).

The optical transmission apparatus 1720 reads out correlation information (step S1903), and then determines the input level Pin, based on the Raman gain efficiency Ga/Po calculated at step S1902 and on the correlation information read out at step S1903 (step S1904).

The optical transmission apparatus 1720 then stops outputting pump light (step S1905). The optical transmission apparatus 1720 then transmits the input level Pin determined at step S1904, to the optical transmission apparatus 1710 (step S1906). Subsequently, the optical transmission apparatus 1710 starts transmitting an optical signal to the optical transmission apparatus 1720 (step S1907).

The optical transmission apparatus 1710 then controls the input level of the optical signal (the transmission of which is started at step S1907) to the transmission fiber 11 to become the input level Pin transmitted to the optical transmission apparatus 1710 at step S1906 (step S1908), ending a series of operations. Afterward, the optical transmission apparatus 1710 may continue input level control carried out at step S1908.

In this manner, the optical transmission apparatus 1720 of the third embodiment measures the Raman gain efficiency Ga/Po of the transmission fiber 11, and determines the input level Pin of an optical signal based on the result of the measurement. The optical transmission apparatus 1720 transmits the determined input level Pin to the optical transmission apparatus 1710 to be able to control the input level of an optical signal input to the transmission fiber 11. Hence, transmission performance is improved.

FIG. 20 depicts a configuration of an optical transmission apparatus according to a fourth embodiment. In FIG. 20, constituent elements similar to those described in FIG. 17 are denoted by the same reference numerals used in FIG. 17 and description thereof is omitted. As depicted in FIG. 20, the optical transmission apparatus 2000 of the fourth embodiment includes the optical couplers 104 and 105, the pump light source 106, the optical coupler 107, the power monitors 108 and 109, and the calculator 110 of FIG. 17, and further includes an amplifier 2001, a DCM 2002, a fiber type estimating unit 2003, a correlation information memory unit 2004, and an output unit 2005.

The optical coupler 105 outputs light from the optical coupler 104, to the amplifier 2001 and to the power monitor 109. The amplifier 2001 amplifies the light from the optical coupler 105 and outputs the amplified light downstream. The amplifier 2001 has the DMC 2002, which carries out dispersion compensation of the light amplified by the amplifier 2001. The calculator 110 outputs the calculated Raman gain efficiency Ga/Po to the fiber type estimating unit 2003.

The fiber type estimating unit 2003 estimates the type of the transmission fiber 11 based on the Raman gain efficiency Ga/Po output from the calculator 110. For example, the correlation information memory unit 2004 stores therein correlation information concerning the correlation between the Raman gain efficiency Ga/Po and the type of the transmission fiber 11. The fiber type estimating unit 2003 reads out correlation information stored in the correlation information memory unit 2004, and estimates the type of the transmission fiber 11 based on the read out correlation information and on the Raman gain efficiency Ga/Po output from the calculator 110. The fiber type estimating unit 2003 outputs the result of estimation of the type of the transmission fiber 11 to the output unit 2005.

The output unit 2005 outputs the result of estimation of the type of the transmission fiber 11 that is output from the fiber type estimating unit 2003. For example, the output unit 2005 serves as a user interface that reports the type of the transmission fiber 11 to the user, enabling the user to know the type of the transmission fiber 11. For example, the user is able to set a parameter for the DCM 2002 or to confirm whether the set parameter for the DCM 2002 is appropriate, based on the type of the transmission fiber 11 that is output from the output unit 2005.

The optical transmission apparatus 2000 may include the transmission level determiner 111, the correlation information memory unit 112, the supervisory channel transmitting unit 1721, and the optical coupler 1722, in addition to the configuration of the optical transmission apparatus 2000 of FIG. 20, enabling the optical transmission apparatus 2000 to determine the proper input level Pin to improve transmission performance and to acquire the result of estimation of the type of the transmission fiber 11.

While an example in which the configuration of the optical transmission apparatus 1720 of FIG. 17 is applied as the optical transmission apparatus 2000 has been described, for example, the configuration of the optical transmission apparatus 100 of FIG. 1 may be applied to the optical transmission apparatus 2000. In such a case, the optical transmission apparatus 100 at the input-side of the transmission fiber 11 is able to acquire the type of the transmission fiber 11.

FIG. 21 depicts an example of correlation information concerning the correlation between Raman gain efficiency and the type of a fiber. A table 2100 of FIG. 21 represents an example of correlation information stored in the correlation information memory unit 2004. In the table 2100, the Raman gain efficiency Ga/Po (Ga_1 to Ga_N) is correlated with the type of the transmission fiber 11 (FT_1 to FT_N).

Each Raman gain efficiency Ga/Po (Ga_1 to Ga_N) may represent, for example, a range of the Raman gain efficiency Ga/Po: $Ga/P_o$=0.010 to 0.015 [dB/mW], Ga/Po=0.015 to 0.020 [dB/mW], . . . . The fiber type estimating unit 2003 acquires the type of the transmission fiber 11 correlated with the table 2100 with the Raman gain efficiency Ga/Po output from the calculator 110, and outputs the acquired type of the transmission fiber 11 to the output unit 2005.

Figure 22:
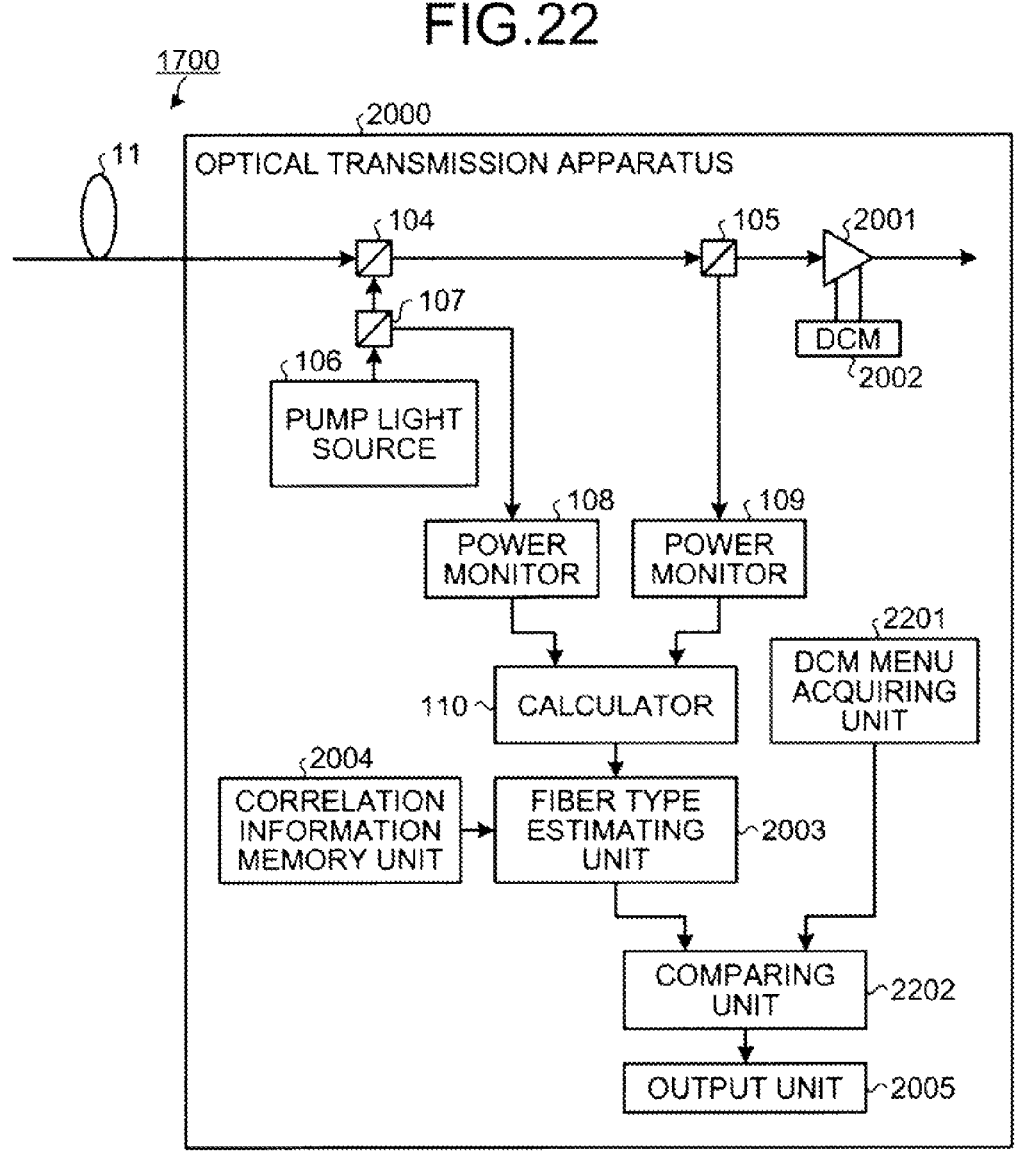
FIG. 22 is a modification of the optical transmission apparatus of FIG. 20.

FIG. 22 is a modification of the optical transmission apparatus of FIG. 20. In FIG. 22, constituent elements similar to those described in FIG. 20 are denoted by the same reference numerals used in FIG. 22 and description thereof is omitted. As depicted in FIG. 22, the optical transmission apparatus 2000 may include a DCM menu acquiring unit 2201 and a comparing unit 2202, in addition to the configuration of FIG. 20.

The DCM menu acquiring unit 2201 acquires a DCM menu applied to the DCM 2002, a DCM menu being information of a parameter for the DCM 2002. The DCM menu acquiring unit 2201 acquires the DCM menu by, for example, making an inquiry to a superior system that administers the optical transmission apparatus 2000. The DCM menu acquiring unit 2201 outputs the DCM menu to the comparing unit 2202.

The comparing unit 2202 compares a DCM menu output from the DCM menu acquiring unit 2201 with the type of the transmission fiber 11 output from the fiber type estimating unit 2003. For example, the comparing unit 2202 stores therein a proper DCM menu for each type of the transmission fiber 11, and determines whether a DCM menu is proper for the type of the transmission fiber 11.

The comparing unit 2202 outputs a determination result to the output unit 2005, which outputs the determination result from the comparing unit 2202. For example, if the comparing unit 2202 outputs a determination result indicating that a DCM menu is improper for the type of the transmission fiber 11, the output unit 2005 issues a warning to the user, enabling the user to know that the DCM 2002 is improper.

For example, if the DCM 2002 is provided with an unexpected DCM as a result of erroneous operation in DCM distribution, the output unit 2005 issues a warning to the user, enabling the user to suspend the start of optical signal transmission or replace the DCM 2002 before the start of optical signal transmission.

Figure 23:
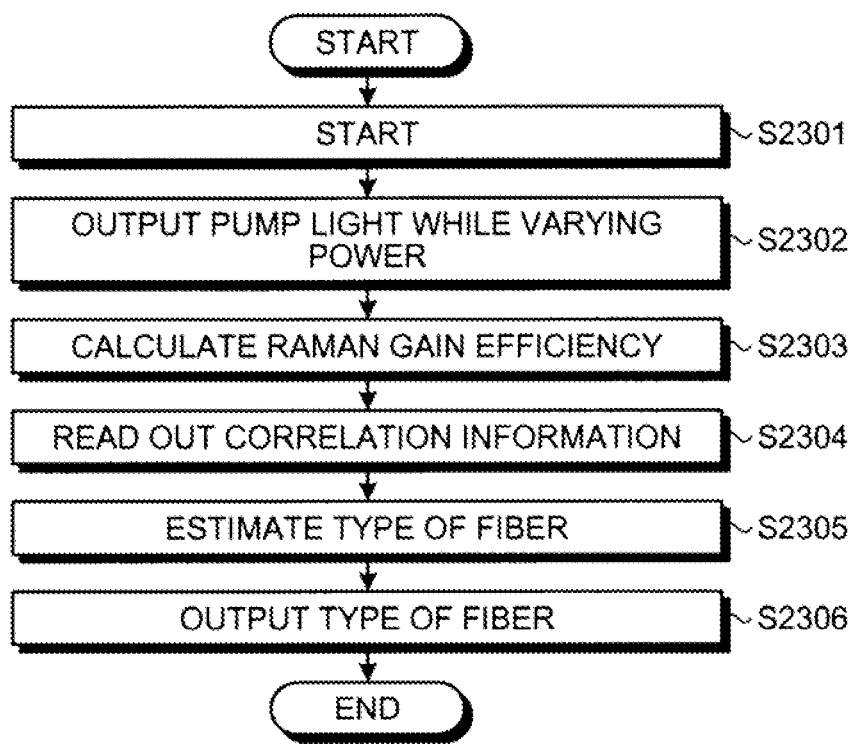
FIG. 23 is a flowchart of an example of operation of the optical transmission apparatus of FIG. 20.

FIG. 23 is a flowchart of an example of operation of the optical transmission apparatus of FIG. 20. The optical transmission apparatus 2000 carries out the following operation under the control of the control circuit of the optical transmission apparatus 2000. When the optical transmission apparatus 2000 starts up (step S2301), the pump light source 106 outputs pump light while varying the power thereof (step S2302).

Subsequently, the calculator 110 calculates the Raman gain efficiency Ga/Po, based on monitoring results from the power monitors 108 and 109, as pump light continues to be output by the operation at step S2302 (step S2303). Following this, the fiber type estimating unit 2003 reads out correlation information stored in the correlation information memory unit 2004 (step S2304).

The fiber type estimating unit 2003 then estimates the type of the transmission fiber 11, based on the Raman gain efficiency Ga/Po calculated at step S2303 and on the correlation information read out at step S2304 (step S2305). Subsequently, the output unit 2005 outputs the type of the transmission fiber 11 estimated at step S2305 (step S2306), after which a series of operations comes to an end.

In this manner, the optical transmission apparatus 2000 of the fourth embodiment estimates the type of the transmission fiber 11 based on the measured Raman gain efficiency Ga/Po, and outputs the result of the estimation. Because the Raman gain efficiency Ga/Po depends on the parameter Leff/Aeff of the transmission fiber 11 (see, e.g., FIG. 10), the type of the transmission fiber 11 can be estimated by using the result of measurement of the Raman gain efficiency Ga/Po.

Figure 24:
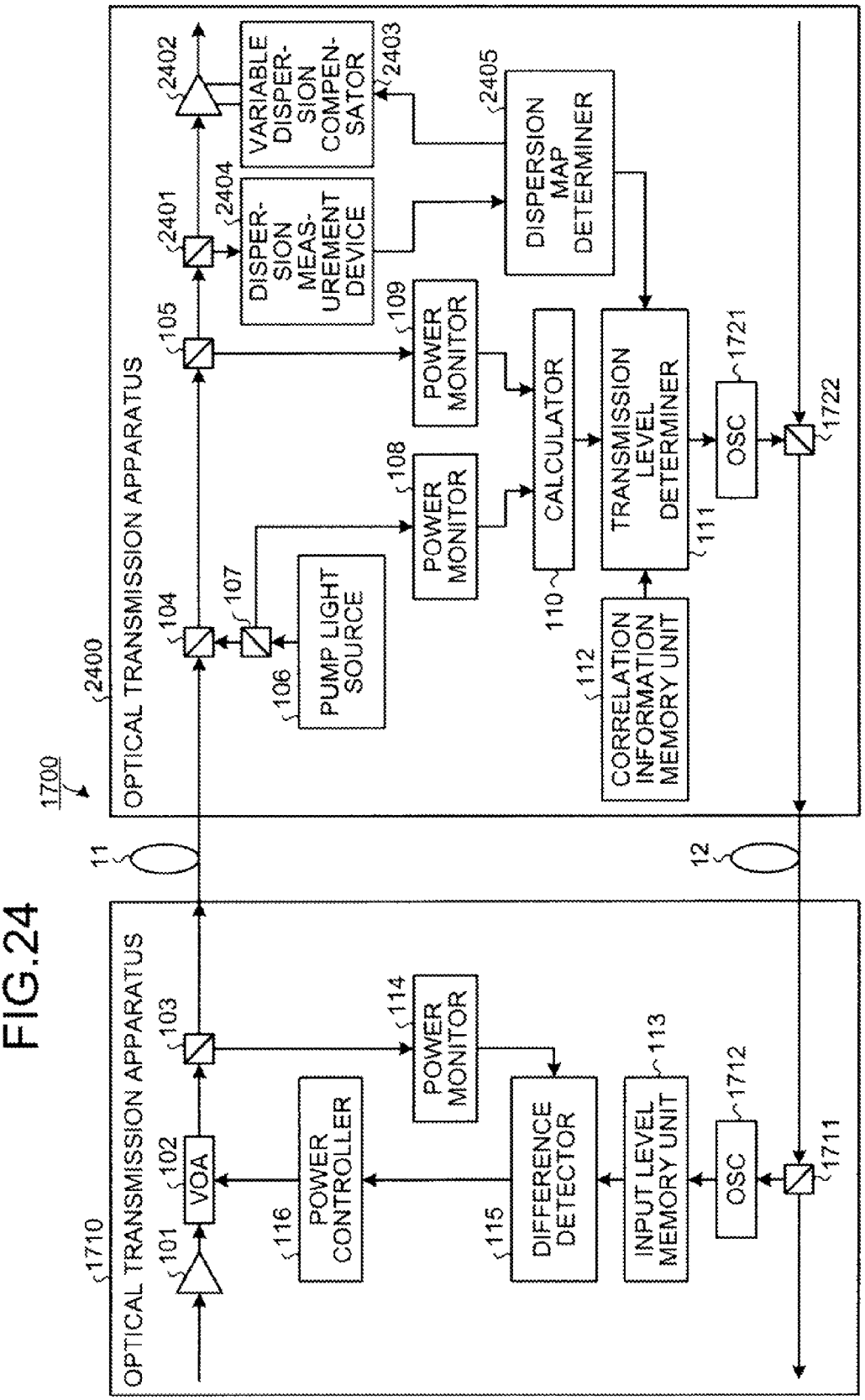
FIG. 24 depicts a configuration of an optical transmission apparatus according to a fifth embodiment.

FIG. 24 depicts a configuration of an optical transmission apparatus according to a fifth embodiment. In FIG. 24, constituent elements similar to those described in FIG. 17 are denoted by the same reference numerals used in FIG. 17 and description thereof is omitted. As depicted in FIG. 24, the optical transmission apparatus 2400 of the fifth embodiment includes an optical coupler 2401, an amplifier 2402, a variable dispersion compensator 2403, a dispersion measurement device 2404, and a dispersion map determiner 2405, in addition to the configuration of the optical transmission apparatus 1720 of FIG. 17.

The optical coupler 105 outputs light from the optical coupler 104, to the optical coupler 2401 and to the power monitor 109. The optical coupler 2401 outputs the light from the optical coupler 105, to the amplifier 2402 and to the dispersion measurement device 2404. The amplifier 2402 amplifies the light from the optical coupler 2401 and outputs the amplified light downstream.

The amplifier 2402 has the variable dispersion compensator 2403, which carries out dispersion compensation of light amplified by the amplifier 2402 at a variable compensation rate. A compensation rate of the variable dispersion compensator 2403 is set based on a dispersion map output from the dispersion map determiner 2405.

The dispersion measurement device 2404 measures wavelength dispersion of light output from the optical coupler 1722, enabling measurement of wavelength dispersion of an optical signal in the transmission fiber 11. The dispersion measurement device 2404 outputs measured wavelength dispersion to the dispersion map determiner 2405.

The dispersion map determiner 2405 determines a dispersion map used by the variable dispersion compensator 2403, based on wavelength dispersion output from the dispersion measurement device 2404. For example, the dispersion map determiner 2405 stores therein correlation information concerning the correlation between wavelength dispersion and a proper dispersion map, thus determines a dispersion map based on wavelength dispersion output from the dispersion measurement device 2404 and on the correlation information. The dispersion measurement device 2404 outputs a determined dispersion map to the variable dispersion compensator 2403 and to the transmission level determiner 111.

The transmission level determiner 111 determines the input level Pin, based on the Raman gain efficiency Ga/Po output from the calculator 110 and wavelength dispersion measured by the dispersion measurement device 2404. For example, the transmission level determiner 111 determines the input level Pin, based on the Raman gain efficiency Ga/Po output from the calculator 110 and on a dispersion map output from the dispersion map determiner 2405. For example, the correlation information memory unit 112 stores therein correlation information concerning the correlation between Raman gain efficiency and an input level for each dispersion map.

Figure 25:
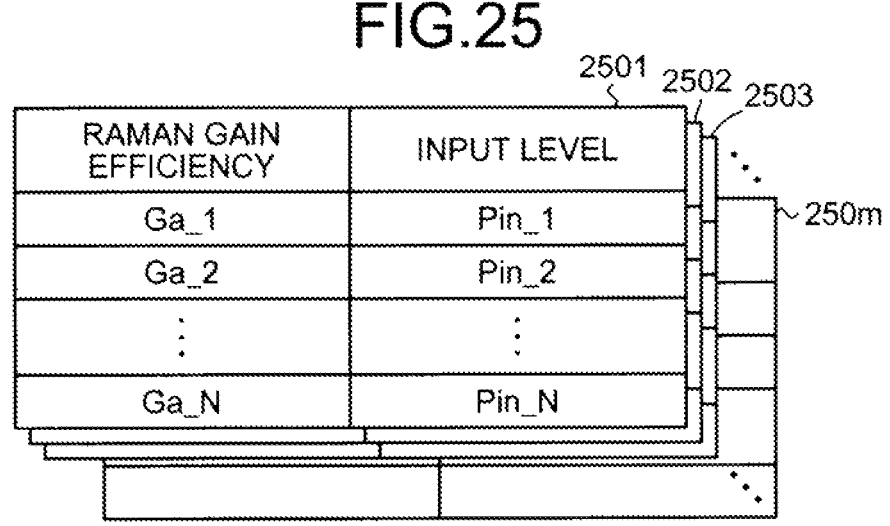
FIG. 25 depicts an example of correlation information for each dispersion map.

FIG. 25 depicts an example of correlation information for each dispersion map. Tables 2501 to 250m of FIG. 25 represent an example of correlation information for each dispersion map 1 to m stored in the correlation information memory unit 112 of FIG. 24. Each of the tables 2501 to 250m is equivalent to the table 1200 of FIG. 12, serving as the table in which the Raman gain efficiency Ga/Po (Ga_1 to Ga_N) is correlated with the proper input level Pin (Pin_1 to Pin_N).

The transmission level determiner 111 reads out, from among the tables 2501 to 250m, a table corresponding to a dispersion map output from the dispersion map determiner 2405. The transmission level determiner 111 then acquires, from the read out table, the input level Pin correlated with the Raman gain efficiency Ga/Po output from the calculator 110 and outputs the acquired input level Pin to the supervisory channel transmitting unit 1721.

FIG. 26 is a sequence diagram of an example of operation of the optical transmission system of FIG. 24. The optical transmission apparatus 1710 and the optical transmission apparatus 2400, for example, carry out the following operation. Operations at steps S2601 and S2602 of FIG. 26 are similar to those at steps S1901 and S1902 of FIG. 19 and are therefore omitted in further description. Following step S2602, the optical transmission apparatus 2400 measures wavelength dispersion at the transmission fiber 11 (step S2603).

The optical transmission apparatus 2400 then determines a dispersion map, based on the wavelength dispersion measured at step S2603 (step S2604). Operations at steps S2605 to S2610 are similar to those at steps S1903 to S1908 of FIG. 19 and are therefore omitted in further description. At step S2605, however, the optical transmission apparatus 2400 reads out correlation information corresponding to the dispersion map determined at step S2604.

In this manner, according to the optical transmission apparatus 2400 of the fifth embodiment, wavelength dispersion at the transmission fiber 11 is measured, and dispersion compensation is carried out by the variable dispersion compensator 2403 using a dispersion map that is determined based on the measured wavelength dispersion, enabling precise compensation of wavelength dispersion occurring in the transmission fiber 11 to improve transmission performance.

The correlation information memory unit 112 stores therein correlation information for each dispersion map, and the transmission level determiner 111 reads out correlation information corresponding to a dispersion map determined based on the measured wavelength dispersion and determines the input level Pin. Because the proper input level Pin for the Raman gain efficiency Ga/Po changes depending on wavelength dispersion at the transmission fiber 11, using correlation information corresponding to a determined dispersion map enables determining the input level Pin for further improving transmission performance.

While an example of storing correlation information in the memory unit for each dispersion map has been described, the correlation information may be stored in the memory unit for each wavelength dispersion. In such a case, the dispersion measurement device 2404 outputs measured wavelength dispersion to the dispersion map determiner 2405 and to the transmission level determiner 111. The transmission level determiner 111 reads out correlation information corresponding to wavelength dispersion output from the dispersion measurement device 2404, from the correlation information memory unit 112, and determines the input level Pin based on a table read out as the correlation information.

As described above, according to the optical transmission apparatus, the optical transmission system, and the optical transmission method, the Raman gain efficiency of a transmission fiber is measured, and since the optimum input level of an optical signal to the transmission fiber depends on the Raman gain efficiency, the input level of the optical signal is controlled to become a level corresponding to the result of measurement of the Raman gain efficiency, enabling an improvement in transmission performance.

For example, even if all parameters (Aeff, α, etc.) of a transmission fiber of several hundreds or thousands km long is not grasped in advance, transmission performance can be improved by determining the input level based on measured Raman gain efficiency, facilitating an improvement in transmission performance.

The optical transmission apparatus, the optical transmission system, and the optical transmission method disclosed herein effect improved transmission performance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission apparatus in an optical transmission system that transmits an optical signal through a transmission fiber, the optical transmission apparatus comprising:
    a measurement device that measures Raman gain efficiency of the transmission fiber;
    a level determiner that determines an input level of the optical signal into the transmission fiber based on Raman gain efficiency measured by the measurement device;
    a controller that controls an input level of the optical signal into the transmission fiber to become the input level determined by the level determiner; and
    a loss calculator that calculates connection loss between the optical transmission apparatus and the transmission fiber, wherein
    the level determiner determines the input level, based on the connection loss calculated by the loss calculator and on the Raman gain efficiency.

2. The optical transmission apparatus according to claim 1, further comprising:
    a pump light source that supplies pump light to the transmission fiber while varying power of the pump light;
    a first monitor that monitors the power of pump light input to the transmission fiber by the pump light source;
    a second monitor that monitors power of amplified optical noises generated in the transmission fiber by the pump light input by the pump light source; and
    a calculator that calculates the Raman gain efficiency, based on monitoring results from the first and the second monitors.

3. The optical transmission apparatus according to claim 2, wherein
    the measurement device measures the Raman gain efficiency with the pump light in a state when the optical signal is not input to the transmission fiber.

4. The optical transmission apparatus according to claim 1, further comprising a memory unit storing therein correlation information concerning correlation between Raman gain efficiency and input level, wherein
    the level determiner determines the input level, based on correlation information stored in the memory unit and on the Raman gain efficiency.

5. The optical transmission apparatus according to claim 1, further comprising an output unit that outputs the connection loss calculated by the loss calculator.

6. The optical transmission apparatus according to claim 1, wherein
    the optical signal includes optical signals from a plurality of wavelength channels,
    the measurement device measures the Raman gain efficiency for each of the wavelength channels,
    the level determiner determines the input level for each of the wavelength channels, and
    the controller controls the level of each optical signal for each of the wavelength channels.

7. The optical transmission apparatus according to claim 1, further comprising:
    an estimating unit that estimates a type of the transmission fiber based on Raman gain efficiency measured by the measurement device; and
    an output unit that outputs an estimation result obtained by the estimating unit.

8. The optical transmission apparatus according to claim 1, further comprising a dispersion measurement device that measures wavelength dispersion of the optical signal occurring in the transmission fiber, wherein
    the level determiner determines the input level, based on the wavelength dispersion measured by the dispersion measurement device and based on the Raman gain efficiency.

9. An optical transmission system that transmits an optical signal through a transmission fiber, the optical transmission system comprising:
    a measurement device that measures Raman gain efficiency of the transmission fiber;
    a level determiner that determines an input level of the optical signal, based on the Raman gain efficiency measured by the measurement device;
    a controller that controls a level of the optical signal input to the transmission fiber to become input level determined by the level determiner; and
    a loss calculator that calculates connection loss between an optical transmission apparatus and the transmission fiber, wherein
    the level determiner determines the input level, based on the connection loss calculated by the loss calculator and on the Raman gain efficiency.

10. An optical transmission method of system that transmits an optical signal through a transmission fiber, the optical transmission method comprising:
    measuring Raman gain efficiency of the transmission fiber;
    determining an input level of the optical signal, based on the Raman gain efficiency measured at the measuring;
    controlling a level of the optical signal input to the transmission fiber to become input level determined at the determining; and
    calculating connection loss between an optical transmission apparatus and the transmission fiber, wherein
    at the determining, the input level is determined based on the connection loss and on the Raman gain efficiency.

* * * * *